US007847510B2

(12) United States Patent
Heckenbach

(10) Patent No.: US 7,847,510 B2
(45) Date of Patent: Dec. 7, 2010

(54) CONTROLLING SWITCHING OF THYRISTORS TO REDUCE POWER LOSS IN VARIABLE SPEED MOTOR

(75) Inventor: Terry Heckenbach, Cedarburg, WI (US)

(73) Assignee: Johnson Controls Technology Company, Holland, MI (US)

( * ) Notice: Subject to any disclaimer, the term of this patent is extended or adjusted under 35 U.S.C. 154(b) by 329 days.

(21) Appl. No.: 12/040,172

(22) Filed: Feb. 29, 2008

(65) Prior Publication Data

US 2009/0218981 A1   Sep. 3, 2009

(51) Int. Cl.
H02P 23/00 (2006.01)
(52) U.S. Cl. ............... 318/799; 318/798; 318/767; 318/727; 318/66
(58) Field of Classification Search ........... 318/799, 318/798, 767, 727, 66
See application file for complete search history.

(56) References Cited

U.S. PATENT DOCUMENTS

| | | | |
|---|---|---|---|
| 3,461,317 A | | 8/1969 | Morgan |
| 3,763,418 A | | 10/1973 | Beck et al. |
| 4,323,835 A | * | 4/1982 | Lee ............... 318/729 |
| 4,459,529 A | * | 7/1984 | Johnson ............ 318/729 |
| 4,706,180 A | | 11/1987 | Wills |
| 5,136,216 A | | 8/1992 | Wills et al. |
| 5,218,283 A | * | 6/1993 | Wills et al. ............ 318/748 |
| 5,276,392 A | | 1/1994 | Beckerman |
| 6,208,113 B1 | * | 3/2001 | Lelkes et al. ............ 318/807 |
| 6,411,653 B1 | | 6/2002 | Arunachalam et al. |
| 6,864,659 B2 | * | 3/2005 | Ratz et al. ............ 318/772 |
| 7,205,786 B2 | | 4/2007 | Ahmad |
| 7,282,887 B1 | | 10/2007 | Williams |

FOREIGN PATENT DOCUMENTS

| | | |
|---|---|---|
| EP | 0157220 A1 | 10/1985 |
| EP | 2099133 A1 | 9/2009 |
| EP | 2101405 A2 | 9/2009 |

OTHER PUBLICATIONS

European Search Report and Opinion for Application No. 09002817.6, dated Jul. 6, 2009, 4 pages.

(Continued)

Primary Examiner—Walter Benson
Assistant Examiner—David S Luo
(74) Attorney, Agent, or Firm—Foley & Lardner LLP

(57) ABSTRACT

Systems and/or methods that facilitate efficiently controlling speed of an induction motor are presented. An optimized control component controls respective switching of an auxiliary switch component associated with an auxiliary winding of the motor, a main switch component associated with a main winding of the motor, and a capacitance adjuster switch component that facilitates adjusting the amount of capacitance associated with the auxiliary winding. The timing of switching on the auxiliary switch component and main switch component can be controlled such that there can be a time difference between the respective switching on of the auxiliary switch component and main switch component to produce additional phase shift to facilitate improving motor efficiency. The capacitance adjuster switch component can be switched on when motor speed is below a predetermined low speed threshold to facilitate increasing the amount of capacitance associated with the auxiliary winding to improve motor efficiency.

16 Claims, 8 Drawing Sheets

OTHER PUBLICATIONS

College of Engineering, University of Wisconsin, Wisconsin Electric Machines and Power Consortium, Research Report 91-18, Oct. 1991, "Adjustable AC Capacitor of a Single Phase Induction Motor" IEEE vol. 29 No. 3, May/Jun. 1993, 7 pages.

Analog Devices. "5 V Slew-Rate Limited Half- and Full-Duplex RS-485/RS-422 Transceivers" (2004) 16 pages.

Power Systems World 2003. "Phase Control Alternatives for Single Phase Motors" 1 page.

Power Systems World 2003. "Phase Control Alternatives for Single Phase Motors Offer Smart, Low Cost, Solutions" 8 pages.

Guy, et al. "Improving Performance and Cost in Single-Pase AC Fan Systems" (Power Electronics Conference 2004, Power Electronics Magazine Jun. 2005) 5 pages.

ALCO Control. "FSP Fan Speed Power Module Technical Data" (Feb. 16, 2006) Emerson Climate Technologies, 8 pages.

Control Resources Inc. "SmartFan Nimbus AC Fan and Motor Control" (2007), 8 pages.

Johnson Controls. "P66 Series Electronic Fan Speed Control" Installation Instructions (Oct. 27, 2005), 8 pages.

Johnson Controls. "P66 Series Electronic Fan Speed Control" Product Bulletin (Mar. 23, 2006), 7 pages.

\* cited by examiner

CONTROLLING SWITCHING OF THYRISTORS TO REDUCE POWER LOSS IN VARIABLE SPEED MOTOR

BACKGROUND

The subject innovation relates generally to thyristors and in particular to controlling thyristors to facilitate reducing power loss in a variable speed motor.

Electric motors account for a significant portion of total energy used in the United States and elsewhere. One popular type of motor is the single-phase induction motor, which can be used in blower and fan applications related to home, commercial, and industrial applications, for example. A popular type of single-phase induction motor is a permanent split capacitor (PSC) motor.

An example application can be utilizing a single-phase induction motor in a refrigeration system—typically air conditioning and refrigeration systems discharge heat to the outdoor ambient. To maintain desired (e.g., optimal) refrigerant pressures and system efficiency in varying ambient temperatures, speed of the motor and condenser cooling fans associated therewith are controlled. One technique to control speed of a motor, such as a PSC motor, and associated cooling fan is to employ a thyristor, such as a triac, to vary speed of the motor. This technique is relatively simple and low cost, but does not drive the motor with desired efficiency. For instance, many motors driven at half speed by this technique require half of full speed power, while the mechanical power required to drive the cooling fan is only one-eighth of the full speed requirement. The difference between the input and output power of the motor is dissipated as heat. As such a motor is cooled by the air moved by the fan, motor temperature can increase as fan speed decreases, which can lead to shortened motor life.

Another technique to control motor speed can be to utilize a variable frequency drive (VFD), which can synthesize variable frequency and voltage to facilitate controlling motor speed. However, in many applications, such as certain original equipment manufacturer (OEM) applications, it is not cost effective to use VFDs to control motor speed.

Still other techniques to control motor speed and reduce motor heating involve using two triacs. For example, in one technique, one triac connects an auxiliary circuit to a power line and the other triac modulates power line current to a main winding, where the auxiliary triac is on unless the motor is off. In another technique, two triacs are placed in series, where one triac controls the auxiliary winding and the other triac connects the main winding to the auxiliary winding. This can result in reduction in motor power at half speed depending on the motor—such techniques are not efficient at certain speeds (e.g., lower motor speeds).

It is desirable to efficiently control motor speed to reduce power loss, reduce motor temperature, and increase motor life. It is also desirable to do so in a cost effective manner.

SUMMARY

The following presents a simplified summary of the innovation in order to provide a basic understanding of some aspects described herein. This summary is not an extensive overview of the disclosed subject matter. It is intended to neither identify key or critical elements of the disclosed subject matter nor delineate the scope of the subject innovation. Its sole purpose is to present some concepts of the disclosed subject matter in a simplified form as a prelude to the more detailed description that is presented later.

According to related aspects, a system that facilitates control of motor speed is described herein. The system can include a motor that is utilized to drive a load. The system also can include an optimized control component that controls respective switching to a particular state of at least two switch components associated with the motor based in part on predefined optimization criteria, wherein the optimized control component controls at least one of timing of switching the at least two switch components to respective particular states or an amount of capacitance associated with the motor.

Another aspect relates to a method that facilitates controlling speed of a motor. The method can include controlling a respective state of at least two switches associated with the motor as a function of predefined optimization criteria. Further, the method can comprise controlling at least one of speed of the motor or an amount of capacitance associated with the motor based in part on respective states of the at least two switches as a function of the predefined optimization criteria.

In still another aspect, a system that facilitates controlling speed of a motor is described herein. The system can comprise means for controlling a respective state of at least two switch components associated with the motor based in part on predefined optimization criteria. The system can further comprise means for controlling at least one of speed of the motor or an amount of capacitance associated with the motor based in part on the respective states of the at least two switch components.

The following description and the annexed drawings set forth in detail certain illustrative aspects of the disclosed subject matter. These aspects are indicative, however, of but a few of the various ways in which the principles of the innovation may be employed and the disclosed subject matter is intended to include all such aspects and their equivalents. Other advantages and distinctive features of the disclosed subject matter will become apparent from the following detailed description of the innovation when considered in conjunction with the drawings.

DETAILED DESCRIPTION

Figure 1:
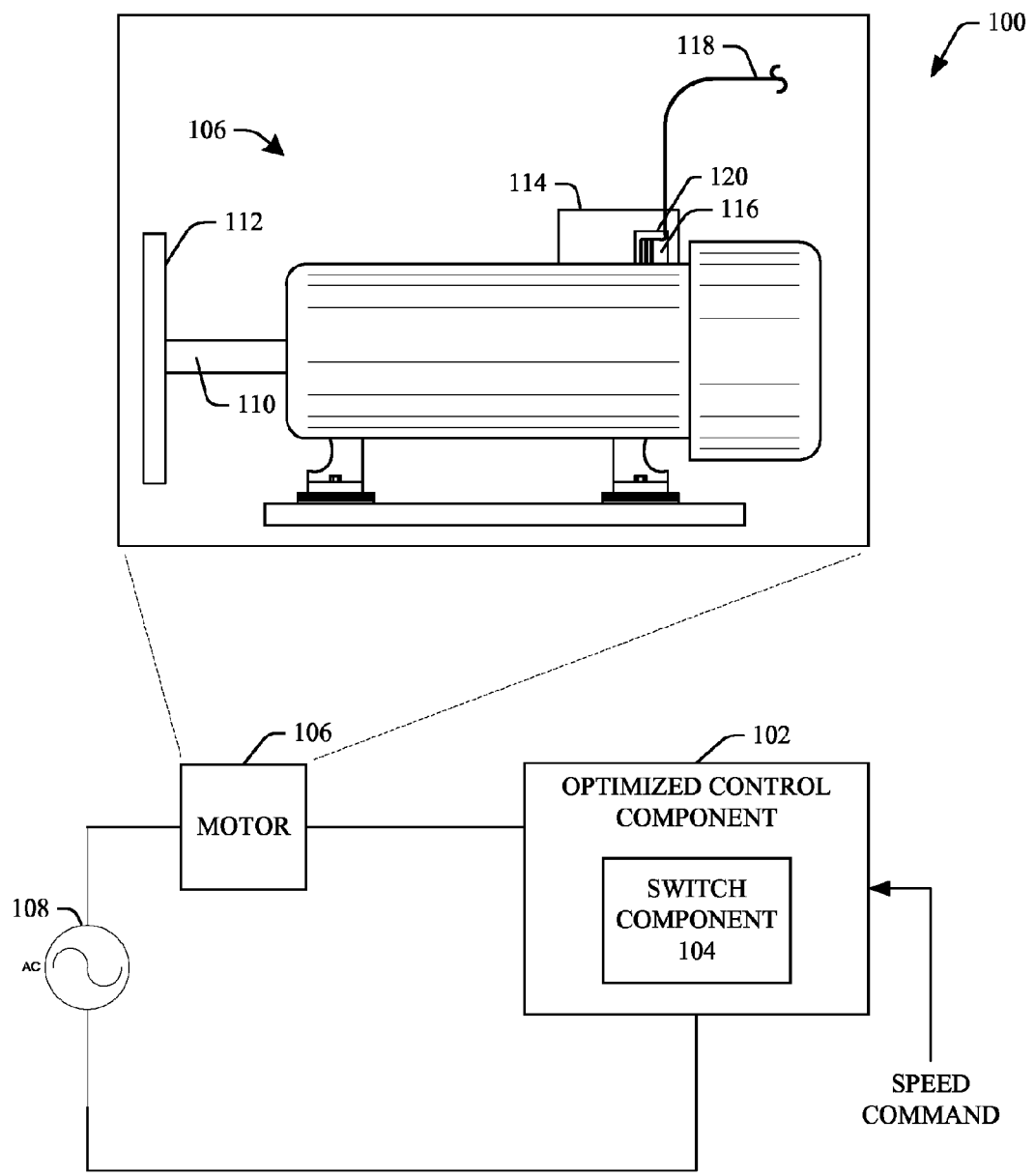
FIG. 1 illustrates a block diagram of a system that can facilitate control of speed of a motor in accordance with an aspect of the subject matter disclosed herein.

The disclosed subject matter is described with reference to the drawings, wherein like reference numerals are used to refer to like elements throughout. In the following description, for purposes of explanation, numerous specific details are set forth in order to provide a thorough understanding of the subject innovation. It may be evident, however, that the disclosed subject matter may be practiced without these specific details. In other instances, well-known structures and devices are shown in block diagram form in order to facilitate describing the subject innovation.

Electric motors, such as single-phase induction motors (e.g. permanent split capacitor (PSC) motor), can be used in blower and fan applications related to home, commercial, and industrial applications, for example. It can be desirable to be able to vary speed of a motor, for example, where the motor is employed as part of a cooling fan in an air conditioning or a refrigeration system, and it is desired to control fan speed based in part on ambient temperature in order to maintain desired (e.g., optimal) refrigerant pressures and system efficiency in varying ambient temperatures. Conventional techniques, such as employing a thyristor (e.g., triac) to control speed of a motor and associated cooling fan, are not efficient with regard to power loss in the motor and other factors. Another conventional technique that employs a variable frequency drive (VFD) to control motor speed is not cost effective for many applications, such as certain original equipment manufacturer (OEM) applications. It is desirable to efficiently control motor speed to reduce power loss, reduce motor temperature, and increase motor life, etc., of the motor. It is also desirable to do so in a cost effective manner.

Systems, methods, and devices are presented that can facilitate controlling switching of respective switch components (e.g., gating on of thyristors, such as triacs) associated with windings of a motor to facilitate controlling speed of a motor in an efficient manner (e.g., reducing power loss in the motor). For instance, a speed command can be received by an optimized control component. The optimized control component can facilitate controlling speed of a motor (e.g., PSC motor) by controlling respective switches (e.g., triacs) associated with motor windings of the motor so that respective switches can be switched on (e.g. gated on) at desired respective times during a cycle (e.g., alternating current (AC) cycle that involves voltage variations due to the frequency of an AC power line connected to the motor) to efficiently vary the motor speed based in part on predefined optimization criteria. In one embodiment, a switch component can employ two switches (e.g., triacs) respectively associated with the auxiliary and main windings of an AC induction motor (e.g., PSC motor). The optimized control component can control timing for turning on the respective switches during a cycle, for example, to facilitate producing additional phase shift at lower motor speeds (e.g., motor speed less than full speed, such as three-quarter speed, half speed, etc.), which can increase motor efficiency. In another embodiment, a switch component can employ three switches, which can be employed to facilitate efficiently controlling motor speed, where one switch (e.g. auxiliary switch) can facilitate control of the auxiliary circuit of the motor, a second switch can connect the main winding to the auxiliary switch, and the third switch can be utilized to facilitate connecting another capacitor(s) in parallel with the run capacitor or can bypass a run capacitor associated with the auxiliary winding of the motor to facilitate increasing capacitance at lower motor speeds (e.g., motor speed less than full speed, such as three-quarter speed, half speed, etc.), where the optimized control component can control timing with regard to turning on of each of the switches and/or can control the amount of capacitance associated with the auxiliary winding in order to facilitate efficiently controlling motor speed.

FIG. 1 illustrates a system 100 that can facilitate control of speed of a motor in accordance with an aspect of the disclosed subject matter. System 100 can include an optimized control component 102 that can include a switch component 104, where the switch component 104 can be utilized to facilitate controlling speed of a motor 106 that can be electrically connected to the optimized control component 102 and switch component 104. The optimized control component 102 and the switch component 104 can facilitate efficiently controlling speed of the motor 106 based in part on predefined optimization criteria. In one aspect, the motor 106 can be an alternating current (AC) induction motor. In one embodiment, the motor 106 can be a PSC motor, although the subject innovation is not so limited and is intended to include virtually any type of AC motor.

The motor 106 can be electrically connected to a power source 108, which can be an AC power source that can provide a desired predetermined AC voltage level (e.g. 120 volts, 240 volts, etc.) at a desired predetermined frequency (e.g., 60 Hz, 50 Hz) to the motor 106 to facilitate operation of the motor 106, where the AC voltage level and frequency of the power source 108 can depend in part on an associated power grid, for example.

In accordance with one embodiment, motor 106 can be a single-phase AC induction motor that can include a shaft coupling 110 that can be connected to an article, such as fan blades 112, that can be driven by the motor 106. The motor 106 can include an enclosure such as a junction box 114 mounted thereon. The junction box 114 can receive conductors 116 that can be connected to a power source via conduit 118. The conductors 116 can be connected within the junction box 114 to power supply mounts 120 of the motor 106. One of the functions of the junction box 114 is to protect the connections at the power supply mounts 120 of the motor 106. The junction box 114 can be suitably weatherproofed to protect the components of the motor 106 from environmental conditions (e.g., dust, moisture, combustible gases, heat, etc.) that can be experienced by the motor 106. For example, the junction box 114 can include thermal insulation to protect the components of the motor 106 from heat generated by the motor 106.

In one aspect, the switch component 104 can comprise a specified number of switches (e.g., 2 triacs, 3 triacs, . . . ) in accordance with various embodiments. The switches can be associated (e.g., electrically connected) with motor windings (e.g. main winding, auxiliary winding) of the motor 106 and can facilitate controlling speed of the motor 106. In accordance with an aspect, the optimized control component 102 can receive a speed command (e.g., signal to change speed), where the speed command can be generated and provided to the optimized control component 102 in response to one or more sensed quantities and/or conditions, such as, for example, ambient temperature, controlled or refrigerant temperature, humidity, pressure, etc., associated with the motor 106 and/or system 100. The optimized control component 102 can facilitate controlling switching on (e.g., gating on) of the respective switches, including independently controlling which switches to turn on and the timing of turning on respective switches during each cycle (e.g., AC cycle that involves voltage variations based in part on the frequency of the power source 108, such as an AC power source delivered to the motor 106 via a power line), based in part on the predefined optimization criteria, to facilitate efficiently controlling speed of the motor 106. Controlling respective switching on of the switches by employing a timing scheme to maintain a time difference between switching on respective switches during a cycle based in part on the predefined optimization criteria can result in improved motor efficiency.

In one aspect, a switch (e.g., auxiliary switch) can be connected to a capacitor (e.g., run capacitor) having a desired capacitance, based in part on the type of motor 106, and an auxiliary winding of the motor 106. Another switch (e.g. main switch) can be utilized to connect the main winding of the motor 106 to the auxiliary switch associated with the auxiliary winding. The optimized control component 102 can control timing of turning on the switches where, during a cycle, the first switch (e.g., auxiliary switch) can be turned on first, and the main switch (e.g. switch associated with the main winding) can be turned on at a predetermined period of time after the first switch based in part on predefined optimization criteria. Maintaining this time difference between turning on the respective switches can facilitate producing an additional phase shift, particularly at lower motor speeds (e.g., motor speed less than full speed, such as three-quarter speed, half speed, etc.). The additional phase shift can result in improved motor efficiency, as there can be a reduction in power loss, reduction in motor temperature, improved motor life, reduced cost, etc., associated with the motor 106. For instance, when the motor 106 is at approximately half speed, system 100 can realize up to approximately 15% reduction in the amount of motor power used (e.g., reduction in power loss in the motor), as compared to conventional motor control systems.

In accordance with another embodiment, the switch component 104 can comprise a capacitance adjuster switch(es) (e.g., triac) that can be employed to facilitate adjusting the amount of capacitance associated with the auxiliary winding of the motor 106 based in part on the predefined optimization criteria. In one aspect, an capacitance adjuster switch can be associated with a capacitor(s) and the capacitor adjuster switch can be turned on to facilitate increasing the amount of capacitance associated with the auxiliary winding of the motor 106 when the motor speed is below a predetermined low speed threshold level to facilitate increasing the current level associated with the auxiliary winding to more efficiently drive the auxiliary winding at lower motor speeds (e.g., motor speed less than full speed, such as three-quarter speed, half speed, etc.). At higher motor speeds (e.g. at or above the predetermined low speed threshold level), the amount of capacitance can be controlled (e.g. additional amount of capacitance can be removed) to facilitate preventing excessive current in the auxiliary winding of the motor 106 at the higher motor speeds.

The predefined optimization criteria can relate to, for example, type of motor 106, speed of the motor 106, time difference between switching on the auxiliary switch associated with the auxiliary winding and the main switch associated with the main winding of the motor 106, amount of capacitance associated with the auxiliary winding of the motor 106, and/or the predetermined low speed threshold level related to adjusting the amount of capacitance associated with the auxiliary winding of the motor 106. In one aspect, the predefined optimization criteria associated with the motor 106 can be static (e.g., fixed) or dynamic, as desired. For instance, the predefined optimization criteria can be dynamic, where such criteria can be generated and/or modified during operation of the motor 106, as desired, to facilitate optimizing the performance of the motor 106.

In one aspect, a look-up table(s) can be employed that can contain information relating to the predefined optimization criteria, such as the desired (e.g. optimal) timing of switching on the respective switches (e.g., auxiliary switch, main switch) during cycles and information related to switching on a capacitance adjuster switch based in part on a predetermined low speed threshold level, with regard to the particular motor 106 utilized in system 100. The timing scheme for switching on the respective switches and the capacitance adjuster switch can be based in part on the predefined optimization criteria. The look-up table(s) can be accessed and information can be retrieved therefrom to facilitate controlling switching of the respective switches, the auxiliary switch, the main switch, and/or the capacitance adjuster switch.

The subject innovation, by employing the optimized control component 102, can facilitate controlling timing of switching on (or off) of switches associated with motor windings of the motor 106 and/or the switching on (or off) of the capacitance adjuster switch to facilitate improving motor efficiency. As a result, the subject innovation can reduce power loss, reduce motor temperature, increase motor life, and reduce costs, etc., associated with the motor 106.

Figure 2A:
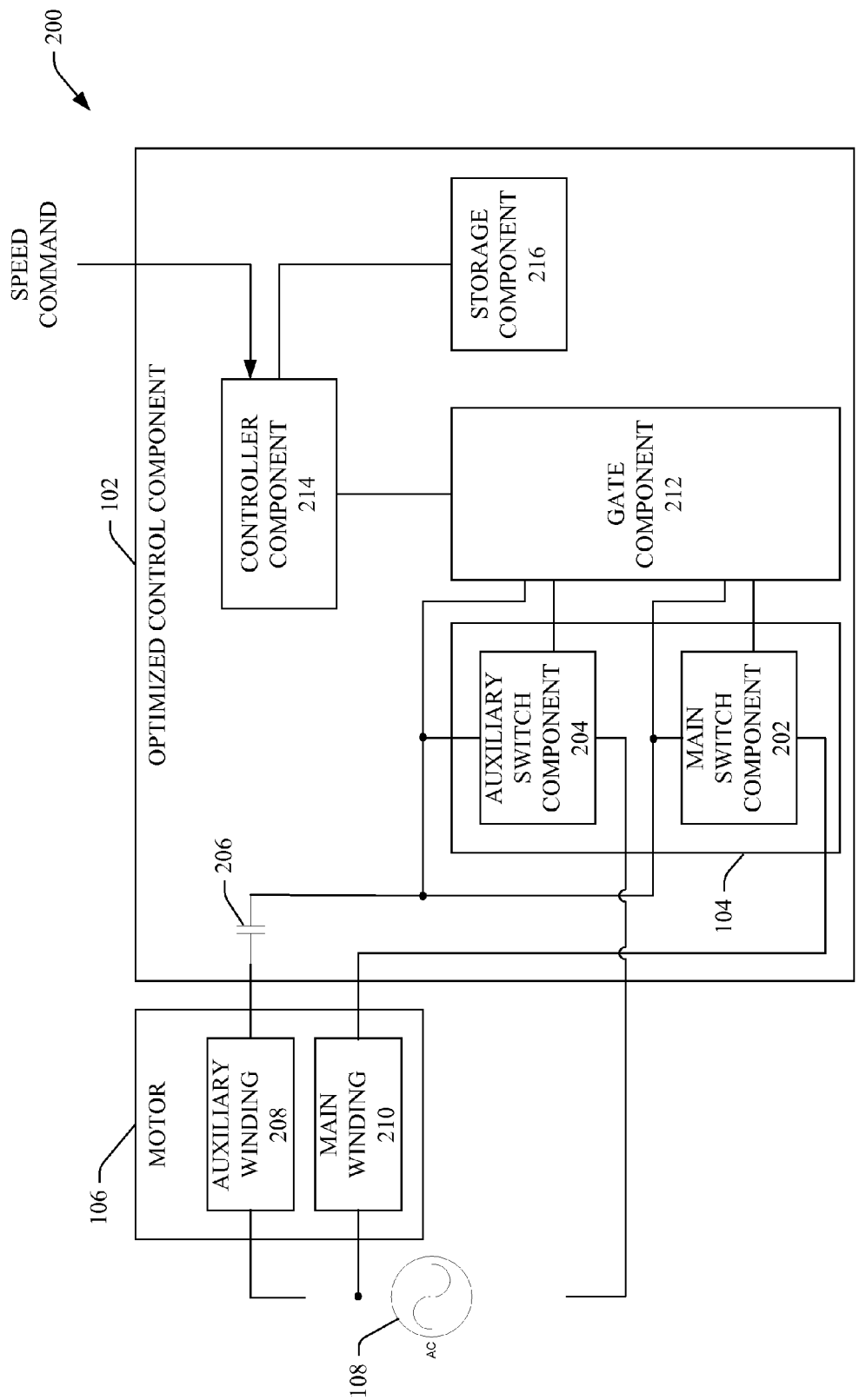
FIG. 2A depicts an example of a block diagram of a system that can facilitate control of motor speed in accordance with an embodiment of the disclosed subject matter.

Turning to FIG. 2A, depicted is a block diagram of a system 200 that can facilitate control of the speed of a motor in accordance with an embodiment of the disclosed subject matter. System 200 can comprise an optimized control component 102 that can facilitate controlling speed of a motor 106 (e.g., AC induction motor) based in part on predefined optimization criteria. The motor 106 can be electrically connected to a power source 108 that can facilitate supplying the desired power (e.g., AC power) to drive the motor 106. The optimized control component 102 can include a switch component 104 that can be utilized to facilitate efficiently controlling speed of the motor 106. It is to be appreciated and understood that the optimized control component 102, the switch component 104, the motor 106, and the power source 108 each can be the same or similar, and/or can contain the same or similar functionality, as respective components, as more fully described herein, for example, with regard to system 100.

In accordance with an aspect, the switch component 104 can comprise a main switch component 202 and an auxiliary switch component 204, that can be utilized to facilitate controlling speed of the motor 106. In accordance with one embodiment, the main switch component 202 and/or auxiliary switch component 204 can be a triac(s). The auxiliary switch component 204 can be electrically connected to a capacitor 206 that can be electrically connected to the auxiliary winding 208 in the motor 106. The main switch component 202 can electrically connect the main winding 210 to the auxiliary switch component 204. Each of the main switch component 202 and auxiliary switch component 204 can contain a gate that can be utilized to switch the associated switch component (e.g. 202, 204) on or off, as desired. The respective gates of each of the main switch component 202 and the auxiliary switch component 204 can be electrically connected to a gate component 212 within the optimized control component 102. The gate component 212 can facilitate turning on (e.g., gating on) the respective switch components 202 and 204 at respective times based in part on the predefined optimization criteria.

In one aspect, upon receiving a speed command (e.g., signal to change speed), the optimized control component 102 can facilitate controlling timing of switching on the auxiliary switch component 204 and the main switch component 202, respectively, to facilitate controlling motor speed based in part on the predefined optimization criteria, which can result in improved motor efficiency (e.g., reduced power loss, improved motor life, etc.). The auxiliary switch component 204 can be utilized to facilitate controlling speed of the motor 106. During a cycle, the auxiliary switch component 204 can be switched on prior to the main switch component 202. At a predetermined period of time after the auxiliary switch component 204 is switched on, the main switch component 202 can be switched on, based in part on the predefined optimization criteria. For instance, the auxiliary switch component 204 can switched on at a specified time, and current can begin to rise in the auxiliary winding 208, and at the predetermined period of time after switching on the auxiliary switch component 204, the main switch component 202 can be switched on and current can begin to rise in the main winding 210. At lower motor speeds (e.g., motor speed less than full speed, such as three-quarter speed, half speed, etc.), this time difference between the switching on of the auxiliary switch component 204 and the main switch component 202 (and the time difference between the respective currents rising in the respective windings 208 and 210) can facilitate producing an additional phase shift. The amount of additional phase shift produced can be based in part on the speed of the motor 106, the type of motor, the time difference between switching on the respective switch components 202 and 204, and/or other factors. The additional phase shift can facilitate improving the efficiency of the motor 106, as for example, there can be up to approximately 15% reduction in power at low motor speeds (e.g., approximately half speed), and even more reduction in power at motor speeds less than half speed, as compared to the amount of power utilized by motors in conventional motor systems at lower motor speeds.

In accordance with an embodiment, the optimized control component 102 can include a controller component 214 that can be connected to the gate component 212, wherein the controller component 214 can be a microcontroller or processor that can provide information (e.g., signals) to the gate component 212 that the gate component 212 can utilize in switching on or switching off the main switch component 202 and the auxiliary switch component 204 at respective times as a function of the predefined optimization criteria. In accordance with an aspect, the controller component 214 can receive a speed command, where the speed command can be generated and provided to the controller component 214 in response to one or more sensed quantities and/or conditions, such as, for example, ambient temperature, controlled or refrigerant temperature, humidity, pressure, etc. associated with the motor 106 and/or system 200. The controller component 214 can provide the desired signals to the gate component 212 to facilitate controlling speed of the motor 106 based in part on the received speed command (e.g., in accordance with the speed command).

In one aspect, look-up tables can be employed that can contain information relating to the predefined optimization criteria, such as the desired (e.g. optimal) timing of switching on the respective switch components 202, 204 during cycles, where the timing of the respective switching can be based in part on the predefined optimization criteria. For instance, the timing for the respective switching on of the main switch component 202 and auxiliary switch component 204 can be based in part on the type of motor associated with the switch components 202 and 204, where, for a first type of motor, the timing for switching on respective switch components 202 and 204 to achieve a desired (e.g., optimal) motor efficiency can be different from the timing for switching on respective switch components 202 and 204 for a disparate type of motor.

The predefined optimization criteria can relate to, for example, type of motor 106, speed of the motor 106, time difference between switching on the auxiliary switch component 204 associated with the auxiliary winding 208 and the main switch component 202 associated with the main winding 210 of the motor 106, amount of capacitance associated with the auxiliary winding 208 of the motor 106, and/or the predetermined low speed threshold level related to adjusting the amount of capacitance associated with the auxiliary winding 208 of the motor 106.

In one aspect, the look-up table(s) can be stored in a storage component 216 that can be associated with and accessed by the controller component 212. A particular look-up table, or portion thereof, related to the motor being employed and the predefined optimization criteria can be retrieved from the storage component 216 by the controller component 214, and the information in such look-up table, or portion thereof, can be utilized to optimally time the turning on (or off) of each of the switch components 202 and 204, respectively, to facilitate efficiently controlling motor speed while reducing and/or minimizing power loss in the motor 106.

For example, with regard to a first type of motor, it can be determined that, for optimal motor efficiency, the auxiliary switch component 204 is to be turned on at time $t_1$ during a cycle and the main switch component 202 is to be turned on at time $t_2$ during the cycle, where $t_2$ can be a predetermined period of time after $t_1$. Further, with regard to a second type of motor, it can be determined that, for optimal motor efficiency, switching timing that is different from the first type of motor is desirable, and the auxiliary switch component 204 is to be turned on at time $r_1$ during a cycle and the main switch component 202 is to be turned on at time $r_2$ during the cycle, where $r_2$ can be a predetermined period of time after $r_1$. Such respective timing information can be stored in a look-up table(s) in storage component 216, and such information can be retrieved by the controller component 214, and in conjunction with the gate component 212, the main switch component 202 and auxiliary switch component 204 can be turned on (e.g., gated on) at the desired respective times based in part on the timing information associated with the particular motor 106 employed in the system 200.

It is to be appreciated that, while the controller component 214 is described herein as employing a microcontroller or processor, the subject innovation is not so limited, as the subject innovation contemplates that other forms for controlling respective timing of the switching on of the switch components 202, 204 can be utilized, such as timing circuitry which can be structured to turn on the switch components 202, 204 at respective times based in part on the type of motor associated therewith and the predefined optimization criteria, for example, and it is intended that all such types of components and/or circuitry be included within the scope of the subject innovation.

Figure 2B:
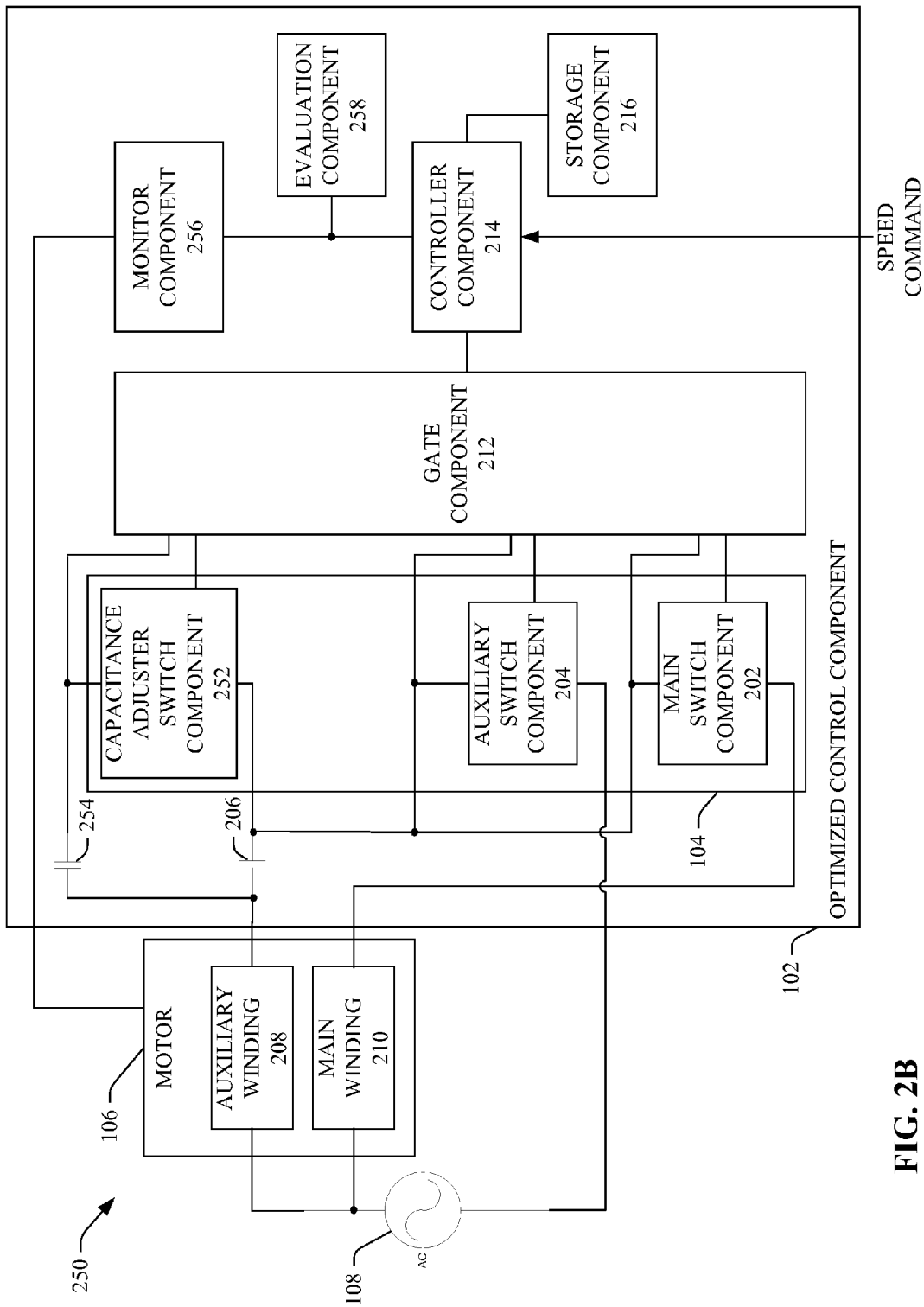
FIG. 2B illustrates an example of a block diagram of a system that can employ three switches to facilitate control of speed of a motor in accordance with an embodiment of the disclosed subject matter

Referring to FIG. 2B, depicted is a block diagram of a system 250 that can employ three switches (e.g., triacs) to facilitate control of the speed of a motor in accordance with an embodiment of the disclosed subject matter. System 250 can comprise the components associated with system 200. For instance, system 250 can include an optimized control component 102 that can facilitate controlling speed of a motor 106 (e.g., AC induction motor) connected thereto, based in part on predefined optimization criteria, where the motor 106 can be electrically connected to a power source 108 that can facilitate supplying the desired power (e.g., AC power) to drive the motor 106. The motor 106 can include a main winding 210 and auxiliary winding 208, where the auxiliary winding 208 can be electrically connected to capacitor 206 (e.g., run capacitor). The optimized control component 102 can include a switch component 104 that can comprise a main switch component 202 that can be associated with the main winding 210 and an auxiliary switch component 204 that can be associated with the auxiliary winding 208, where the switch component 104 can facilitate controlling motor speed. The optimized control component 102 also can include a gate component 212, a controller 214, and a storage component 216 that can be utilized to facilitate controlling speed of the motor 106. It is to be appreciated and understood that the optimized control component 102, the switch component 104, the motor 106, the power source 108, the main switch component 202, the auxiliary switch component 204, the capacitor 206, the auxiliary winding 208, the main winding 210, the gate component 212, the controller component 214, and the storage component 216, each can be the same or similar, and/or can contain the same or similar functionality, as respective components, as more fully described herein, for example, with regard to system 100 and/or system 200.

In accordance with an embodiment, the optimized control component 102 can facilitate controlling respective switching on (or off) of the main switch component 202 and auxiliary switch component 204 based in part on the predefined optimization criteria to facilitate improving the efficiency of the motor 106. In one aspect, the auxiliary switch component 204 can be electrically connected to the capacitor 206 that can be electrically connected to the auxiliary winding 208 in the motor 106. The main switch component 202 can electrically connect the main winding 210 to the auxiliary switch component 204. The auxiliary switch component 204 can be utilized to facilitate controlling speed of the motor 106.

In accordance with an aspect, the controller component 214 can receive a command, such as a speed command. For instance, a speed command can be generated in response to one or more sensed quantities and/or conditions, such as ambient temperature, controlled or refrigerant temperature, humidity, pressure, etc. associated with the motor 106 and/or system 250, to facilitate controlling (e.g. adjusting) speed of the motor 106. The command can be provided to the controller component 214, and the controller component 214 can provide the desired signals to the gate component 212 to facilitate controlling speed of the motor 106 based in part on the received speed command (e.g., in accordance with the speed command).

During each cycle, the gate component 212 can send a signal to the gate of the auxiliary switch component 204 to switch on the auxiliary switch component 204 before the main switch component 202. Based in part on the predefined optimization criteria, the gate component 212 can send a signal to the gate of the main switch component 202 to switch on the main switch component 202 at a predetermined period of time after the auxiliary switch component 204 is switched on. By maintaining a time difference between the switching on of the auxiliary switch component 204 and the main switch component 202, which can produce a time difference between the rising of respective currents in the respective windings 208 and 210, there can be additional phase shift produced, particularly at lower motor speeds (e.g., motor speed less than full speed, such as three-quarter speed, half speed, etc.), where the amount of additional phase shift can be based in part on the speed of the motor 106, the type of motor, the time difference between switching on the respective switch components 202 and 204, and/or other factors. The additional phase shift can facilitate improving the efficiency of the motor 106, as for example, there can be up to approximately 15% reduction in power at lower motor speeds (e.g., approximately half speed) (and further reduction in power loss at motor speeds below half speed), as compared to the amount of power utilized by motors in conventional motor systems at lower motor speeds.

In accordance with various embodiments, the subject innovation can facilitate adjusting the amount of capacitance associated with the auxiliary winding 208 to facilitate further improving the efficiency of the motor 106 (e.g., reduce power loss in the motor 106, including at low motor speeds; reducing motor temperature; improving motor life; etc.), as compared to conventional devices or systems.

Conventionally, a run capacitor associated with an auxiliary winding of an AC induction motor typically can have a value that can be based in part on the desired amount of capacitance when the motor is operated at full speed. However, as the speed of an AC induction motor is reduced (e.g., approximately half speed or below), the current through the run capacitor can be too low such that there can be insufficient current to drive the auxiliary winding, as desired, which can negatively impact motor efficiency (e.g., power loss in the motor can increased, motor temperature can be increased). Simply increasing the capacitance value of the run capacitor can be undesirable, as when the motor is operating at or near full speed, there can be excessive current in the auxiliary winding, which can harm the motor.

In accordance with an embodiment, switch component 104 can include a capacitance adjuster switch component 252 (e.g., triac) that can be utilized to facilitate further optimizing the efficiency of the motor 106. The capacitance adjuster switch component 252 can be electrically connected with capacitor(s) 254, where capacitor(s) 254 can be placed in parallel with the capacitor 206 (e.g., run capacitor). The capacitance value of capacitor(s) 254 can be as desired and can be based in part on the type of motor associated therewith and the speed ranges, or expected speed ranges, in using the motor 106, for example. In accordance with an aspect, at or below a predetermined low speed threshold for the motor 106, the gate component 212 can receive information (e.g., signal) from the controller component 214 that can indicate that the capacitance adjuster switch component 252 is to be turned on (e.g., gated on). Upon receiving such information, the gate component 212 can facilitate turning on the capacitance adjuster switch component 252, so that, in addition to capacitor 206, the capacitor(s) 254 can be part of the circuit associated with the auxiliary winding 208, which can increase the amount of capacitance associated with the auxiliary winding 208 to facilitate increasing current in the auxiliary winding 208 when the motor speed is set at or below the predetermined low speed threshold. The predetermined low speed threshold can be based in part on the predefined optimization criteria, where, for instance, the predetermined low speed threshold can be based in part on the type of motor employed in system 250.

In accordance with another aspect, the optimized control component 102 can comprise a monitor component 256 that can monitor and/or measure (e.g. receive feedback regarding) various parameters or conditions associated with the motor 106, including, but not limited to, speed, current, voltage, power, power factor, associated with the motor 106; velocity and/or pressure of the airflow discharge of a fan associated with the motor 106; and/or other parameters associated with the motor 106 or the load. For instance, the monitor component 256 can monitor and/or measure the speed of the motor 106 to facilitate evaluation of the motor speed in order to facilitate determining whether the amount of capacitance associated with the auxiliary winding 208 is to be adjusted.

The optimized control component 102 can further contain an evaluation component 258 that can receive information relating to the speed of the motor 106 (and/or other information related to other parameters associated with the motor 106) as well as information relating to the predetermined low speed threshold level for the motor 106, which the controller component 214 can retrieve from the storage component 216 and can provide to the evaluation component 258. The evaluation component 258 can evaluate (e.g., compare) the monitored motor speed and the information regarding the predetermined low speed threshold level and can determine whether the amount of capacitance associated with the auxiliary winding 208 is to be adjusted.

For example, if the motor speed is observed by the monitor component 256 to drop from a high speed (e.g., at or above the predetermined low speed threshold level) to a speed that is below the predetermined low speed threshold level for the motor 106, the evaluation component 258 can determine that the amount of capacitance associated with the auxiliary winding 208 should be adjusted, based in part on the predefined optimization criteria (e.g., predetermined low speed threshold level). The evaluation component 258 can communicate that determination to the controller component 214, and the controller component 214 can transmit a signal to the gate component 212 to turn on the capacitance adjuster switch component 252. The gate component 212 can transmit a signal to the gate of the capacitance adjuster switch component 252 to facilitate turning on the capacitance adjuster switch component 252, which can electrically connect the capacitor 254 to the auxiliary winding 208, where capacitor 254 can be in parallel with the capacitor 206, and this can result in an increase in the amount of capacitance associated with the auxiliary winding 208. The increased capacitance, when the motor 106 is at the lower speed, can significantly improve the efficiency of the motor 106, as compared to conventional motor systems. It is noted that an adjustment (e.g. increase, decrease) in the amount of capacitance associated with the auxiliary winding 208 can also result in a change in speed of the motor 106 from the desired motor speed (e.g., motor speed prior to adjusting the amount of capacitance). The monitor component 256 can monitor and/or measure any change to the motor speed, and the controller component 214 can facilitate modifying the switching (e.g., gating) on of the auxiliary switch component 204 and main switch component 202 during each cycle in order to maintain the desired motor speed.

As further example, when the motor is operating at a low speed (e.g., below the predetermined low speed threshold level), the amount of capacitance can be at an increased amount of capacitance, as the capacitance adjuster switch component 252 can be in the on state to electrically connect the capacitor 254 to the auxiliary winding 208. If the monitored motor speed is observed to change from the low speed to a higher speed (e.g., at or above the predetermined low speed threshold level), the evaluation component 258 can determine that the capacitance should be adjusted to decrease the amount of capacitance, based in part on the predefined optimization criteria. The evaluation component 258 can transmit that determination to the controller component 212, and the controller component 214 can transmit a signal to the gate component 212 to switch off the capacitance adjuster switch component 252. The gate component 212 can transmit a signal to the gate of the capacitance adjuster switch component 252 to facilitate switching off the capacitance adjuster switch component 252, which disconnect the capacitor 254 from the auxiliary winding 208, and this can result in a decrease in the amount of capacitance associated with the auxiliary winding 208, as only capacitor 206 will be connected to the auxiliary winding 208. The decrease in the amount of capacitance can facilitate preventing excessive current from flowing in the auxiliary winding 208 when the motor 106 is at the higher speed, as excessive current can be harmful to the motor 106. It is noted that the switching of the auxiliary switch component 204 and main switch component 202 during each cycle can be adjusted to compensate for any change in the motor speed resulting from the adjustment to the amount of capacitance associated with the auxiliary winding 208 in order to maintain the desired motor speed after the capacitance is adjusted.

In yet another embodiment, an alternative switching of the switch components 202 and 204 can be employed. In one aspect, the main switch component 202 can be in a continuous on state. The auxiliary switch component 204 can be utilized and controlled to facilitate controlling speed of the motor 106, as it can be switched on and off, as desired, to vary motor speed. In accordance with another aspect, the capacitance adjuster switch component 252 can be controlled (e.g., switched on or off) to facilitate adjusting the amount of capacitance associated with the auxiliary winding 208 based in part on the predefined optimization criteria. For instance, at a low motor speed (e.g., below the predetermined low speed threshold level), the capacitance adjuster switch component 252 can be switched on to facilitate increasing the amount of capacitance associated with the auxiliary winding 208, and/or, at a high motor speed (e.g., at or above the predetermined low speed threshold level), the capacitance adjuster switch component 252 can be switched off to facilitate decreasing the amount of capacitance associated with the auxiliary winding 208, such as more fully described herein.

By controlling (e.g., adjusting to increase or decrease) the amount of capacitance associated with the auxiliary winding 208, the subject innovation can facilitate significantly improving the efficiency of the motor 106. For example, as compared to certain conventional techniques, at half speed for the motor 106, the subject innovation, by employing the timing scheme for switching on the respective switch components 202 and 204, and employing the capacitance adjuster switch component 252 to facilitate controlling the amount of capacitance associated with the auxiliary winding 208 based in part on the predetermined low speed threshold level, motor power used to operate at half speed can be reduced up to approximately 40% (e.g., reduce power loss in the motor 106), and can further save more power at even lower motor speeds (e.g., lower than half speed), where typically fan cooling can be less effective.

It is to be appreciated and understood, that, while the disclosed subject matter describes using three switch components (e.g., main switch component 202, auxiliary switch component 204, capacitance adjuster switch component 252) to facilitate efficiently controlling (e.g. varying) motor speed, the subject innovation is not so limited, as the subject innovation contemplates that one or more additional switch components (e.g., triacs) can be employed as desired to facilitate improving motor efficiency. For instance, one or more additional switch components can be employed, where each additional switch component can be connected to an additional capacitor, and when a particular additional switch component is switched on, the capacitor associated therewith can be electrically connected to the auxiliary winding 208 (e.g. where the additional capacitor can be in parallel to capacitor 206) to adjust (e.g., increase) the amount of capacitance associated with the auxiliary winding 208, as desired, based in part on the predefined optimization criteria. Employing additional switch components and associated additional capacitors can facilitate fine tuning capacitance adjustments associated with the auxiliary winding 208 to facilitate improved motor efficiency.

Figure 3:
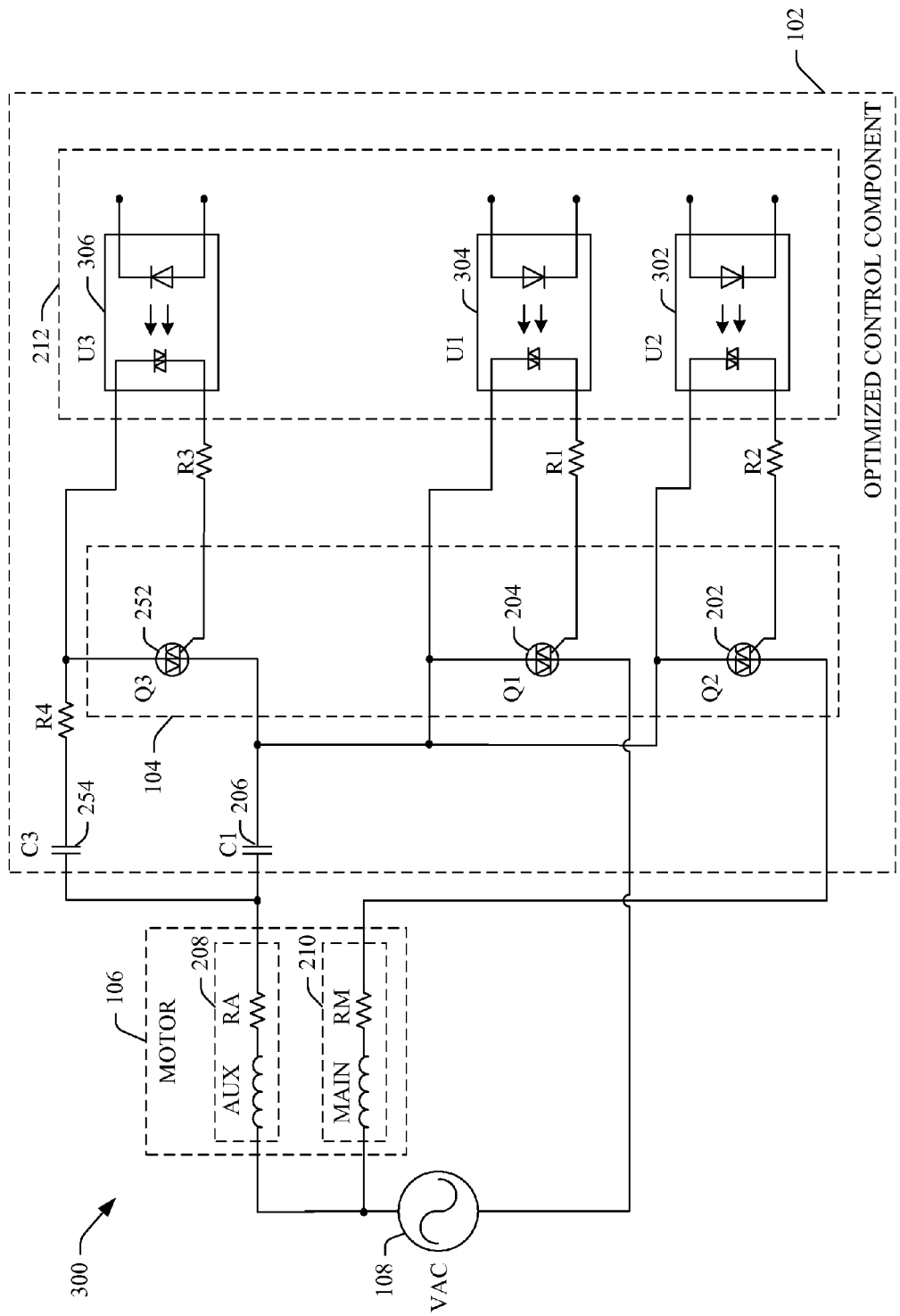
FIG. 3 depicts a schematic diagram of a system that can facilitate controlling motor speed in accordance with an embodiment of the disclosed subject matter.

Turning to FIG. 3, depicted is a schematic diagram of a system 300 that can facilitate efficiently controlling motor speed in accordance with an embodiment of the disclosed subject matter. System 300 can comprise an optimized control component 102 that can facilitate controlling speed of a motor 106 (e.g., AC induction motor) based in part on predefined optimization criteria and/or received commands (e.g., a speed command). The motor 106 can be electrically connected to a power source 108 that can facilitate supplying the desired power (e.g., AC power) to drive the motor 106. In one aspect, the motor 106 can be an AC induction motor (e.g., PSC motor) that can comprise an auxiliary winding 208 and a main winding 210. The auxiliary winding 208 can be electrically connected to a capacitor 206 (e.g., run capacitor), which can facilitate current flow to drive the auxiliary winding 208.

In another aspect, the optimized control component 102 can include a switch component 104 that can be utilized to facilitate efficiently controlling speed of the motor 106, including being able to adjust the amount of capacitance associated with the auxiliary winding 208, as desired. In accordance with an embodiment, the switch component 104 can comprise a main switch component 202, which can be a triac (e.g., phase-gated triac) that can be associated with the main winding 210; an auxiliary switch component 204, which can be a triac that can be associated with the auxiliary winding 208; and a capacitance adjuster switch component 252, which can be a triac that can be connected to a capacitor 254. The auxiliary switch component 204 can facilitate controlling the auxiliary winding 208. The main switch component 202 can electrically connect the main winding 210 to the auxiliary switch component 204. The capacitance adjuster switch component 252 can facilitate adjusting the amount of capacitance associated with the auxiliary winding 208, wherein the capacitor adjuster switch component 252 can be switched on to facilitate electrically connecting the capacitor 254 to the auxiliary winding 208 to increase the amount of capacitance associated with the auxiliary winding 208, where the capacitor 254 can be in parallel with the capacitor 206 in the circuit, and can be switched off to facilitate disconnecting the capacitor 254 from the auxiliary winding 208 to decrease the amount of capacitance associated with the auxiliary winding 208, based in part on the predefined optimization criteria. The capacitance value of the capacitor(s) 254 can be as desired and can be based in part on the type of motor associated therewith and the speed ranges, or expected speed ranges, in using the motor 106, for example.

In accordance with an embodiment, the optimized control component 102 also can include a gate component 212 that can receive signals from a controller component 214 (e.g., as depicted in FIGS. 2A and 2B and described herein) to facilitate independently switching (e.g., gating) the switch components 202, 204, and 252, as desired. The gate component 212 can comprise a main gate component 302 that can be an optotriac that can be electrically connected to the gate of the main switch component 202. In one aspect, the main gate component 302 can send respective signals to the gate of the main switch component 202 to facilitate turning the main switch component 202 on or off. The gate component 212 also can include an auxiliary gate component 304 that can be an optotriac that can be electrically connected to the gate of the auxiliary switch component 204, where the auxiliary gate component 304 can send respective signals to the gate of the auxiliary switch component 204 to facilitate switching the auxiliary switch component 204 on or off. The gate component 212 can further include a capacitance adjuster gate component 306 that can be an optotriac that can be electrically connected to the gate of the capacitance adjuster switch component 252. The capacitance adjuster gate component 306 can send respective signals to the gate of the capacitance adjuster switch component 252 to facilitate turning the capacitance adjuster switch component 252 on or off.

In accordance with an embodiment, the optimized control component 102 can facilitate controlling timing of the respective switching on (or off) of the main switch component 202 and auxiliary switch component 204 based in part on the predefined optimization criteria to facilitate improving the efficiency of the motor 106. In one aspect, the auxiliary switch component 204 can be electrically connected to the capacitor 206 that can be electrically connected to the auxiliary winding 208 in the motor 106. The main switch component 202 can electrically connect the main winding 210 to the auxiliary switch component 204. In one aspect, the auxiliary switch component 204 can be utilized to facilitate controlling speed of the motor 106. During a cycle, the auxiliary gate component 304 can send a signal to the gate of the auxiliary switch component 204 to facilitate switching on the auxiliary switch component 204, wherein the auxiliary switch component 204 can be switched on before the main switch component 202. At a predetermined period of time after the auxiliary switch component 204 is switched on the main switch component 202 can be switched on, wherein the main gate component 302 can send a signal to the gate of the main switch component 202 to facilitate switching on the main switch component 202, based in part on the predefined optimization criteria. As a result, there can be a time difference between the switching on of the auxiliary switch component 204 and the main switch component 202, and this time difference can result in a time difference between the rising of respective currents in the respective windings 208 and 210, which can facilitate producing an additional phase shift, particularly at lower motor speeds (e.g. motor speed less than full speed, such as three-quarter speed, half speed, etc.). The amount of additional phase shift produced can be based in part on the speed of the motor 106, the type of motor, the time difference between switching on the respective switch components 202 and 204, and/or other factors. The additional phase shift can facilitate improving the efficiency of the motor 106. For example, there can be up to approximately 15% reduction in power at lower motor speeds (e.g., approximately half speed), as compared to the amount of power utilized by motors at lower motor speeds in conventional motor systems.

In accordance with an embodiment, the capacitance adjuster switch component 252 can be utilized to facilitate further optimizing the efficiency of the motor 106. Based in part on predefined optimization criteria, a motor 106 can have a predetermined low speed threshold level associated therewith, where the predetermined low speed threshold level can be the point below which it can be desirable to increase the amount of capacitance associated with the auxiliary winding 208 to facilitate improved motor efficiency. In one aspect, when the speed of the motor 106 is at or below a predetermined low speed threshold level, the capacitor adjuster gate component 306 in the gate component 212 can receive information (e.g., signal) that can indicate that the capacitance adjuster switch component 252 is to be turned on. Upon receiving such information, the capacitance adjuster gate component 306 can transmit a signal to the gate of the capacitance adjuster switch component 252 to facilitate switching on the capacitance adjuster switch component 252. Switching on the capacitance adjuster switch component 252 can facilitate electrically connecting the capacitor(s) 254 to the auxiliary winding 208, wherein the capacitor(s) 254 can be in parallel with the capacitor 206 in the circuit, and this can increase the amount of capacitance associated with the auxiliary winding 208 to facilitate increasing current in the auxiliary winding 208 when the speed of the motor 106 is set at or below the predetermined low speed threshold level. The predetermined low speed threshold level can be based in part on the predefined optimization criteria, where, for instance, the predetermined low speed threshold level can be based in part on the particular motor 106 utilized in system 300.

Due to the adjustment (e.g., increase) in the amount of capacitance, the motor speed may vary from the desired speed. In one aspect, the gating timing can be adjusted to modify the switching on/off of the auxiliary switch component 204 and main switch component 202 during each cycle to compensate for any change in the motor speed resulting from the adjustment to the amount of capacitance associated with the auxiliary winding 208 and the desired motor speed can be maintained.

If the motor speed is changed so that the motor speed is at or above the predetermined low speed threshold level, the capacitance adjuster gate component 306 can receive information indicating that the capacitance adjuster switch component 252 is to be turned off to facilitate reducing the amount of capacitance associated with the auxiliary winding 208. The capacitance adjuster gate component 306 can transmit a signal to the gate of the capacitance adjuster switch component 252 to facilitate switching off component 252. Switching off the capacitance adjuster switch component 252 can facilitate disconnecting the capacitor 254 from the auxiliary winding 208 to reduce the amount of capacitance associated with the auxiliary winding 208. Such reduction in capacitance can facilitate preventing excessive current from flowing in the auxiliary winding 208 when the motor 106 is operating at higher speeds (e.g., at or above the predetermined low speed threshold level), which is desirable, as excessive current can harm the motor 106. In accordance with one aspect, the timing of switching on/off of the auxiliary switch component 204 and main switch component 202 can be adjusted, as desired, in order to maintain the desired motor speed after changing the amount of capacitance associated with the auxiliary winding 208, as such change in capacitance can potentially result in a change in motor speed.

In yet another embodiment, an alternative switching of the switch components 202 and 204 can be employed. In one aspect, the main switch component 202 can be in a continuous on state, wherein the main gate component 302 can provide a signal(s) to the gate of the main switch component 202 to facilitate maintaining the main switch component 202 in a continuous on state. In another aspect, the switching of the auxiliary switch component 204 can be controlled to facilitate controlling speed of the motor 106, as it can be switched on and off, as desired, to vary the speed of the motor 106. The auxiliary gate component 304 can receive information (e.g., signals) that can indicate when the auxiliary switch component 204 is to be switched on and/or switched off. Based in part on the received information, the auxiliary gate component 304 can transmit a desired signal (e.g., on signal, off signal) to the gate of the auxiliary switch component 204 to facilitate switching the auxiliary switch component 204 on or off, as desired, to facilitate controlling speed of the motor 106.

It should be noted that, in an alternative embodiment, the auxiliary switch component 204 can be in a continuous on state, and switching of the main switch component 202 can be controlled to facilitate controlling speed of the motor 106. The main gate component 302 can receive information, such as signals from the controller component 214, that can indicate when the main switch component 202 is to be switched on and/or switched off. Based in part on the received information, the main gate component 302 can transmit a desired signal (e.g., on signal, off signal) to the gate of the main switch component 202 to facilitate controlling switching of the main switch component 202 to facilitate controlling speed of the motor 106.

It is to be appreciated and understood that the optimized control component 102, the switch component 104, the motor 106, and the power source 108 each can be the same or similar, and/or can contain the same or similar functionality, as respective components, as more fully described herein, for example, with regard to system 100, system 200, and/or system 250. It is to be further appreciated that the optimized control component 102 can also comprise a controller component 214, a storage component 216, a monitor component 256, and an evaluation component 258, each of which can comprise the same or similar functionality as respective components, as more fully described herein, but for reasons of clarity and brevity, the controller component 214, storage component 216, monitor component 256, and evaluation component 258, are not illustrated in FIG. 3.

It is to be understood and appreciated that system 300 is but one example for efficiently controlling speed of a motor 106, and controlling the amount of capacitance associated with the auxiliary winding 208 of the motor 106, and the subject innovation is not so limited. The disclosed subject matter contemplates that, in various other embodiments, the components and circuitry can be modified without materially departing from the subject innovation, and it is intended that all such modifications be included within the scope of the disclosed subject matter.

Figure 4:
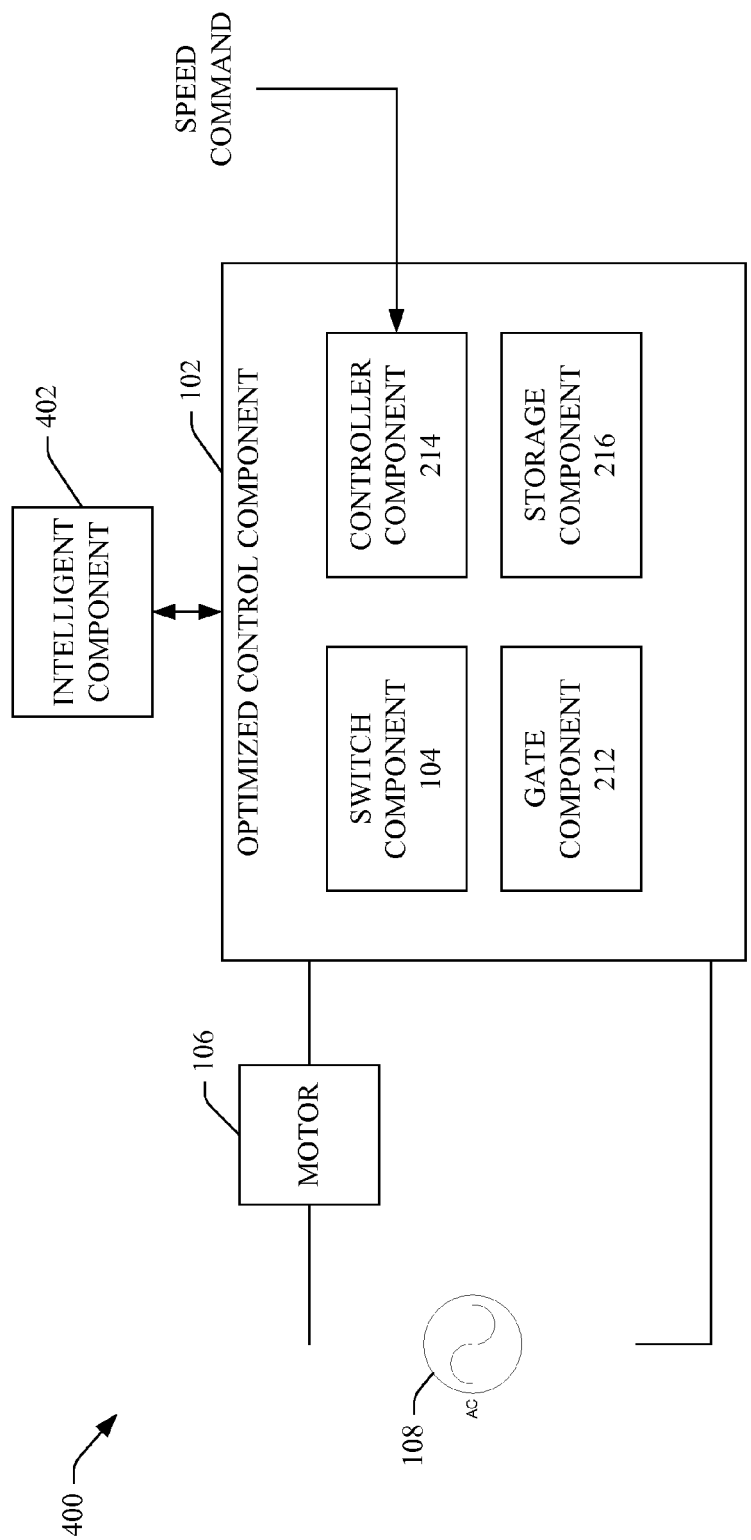
FIG. 4 illustrates a block diagram of a system that can employ intelligence to facilitate controlling motor speed in accordance with another embodiment of the disclosed subject matter.

Referring to FIG. 4, depicted is a block diagram of a system 400 that can employ intelligence to facilitate control motor speed in accordance with an embodiment of the disclosed subject matter. In accordance with an aspect, system 400 can include an optimized control component 102, a switch component 104, a motor 106, a power source 108, a gate component 212, a controller component 214, and a storage component 216, where the optimized control component 102 and associated components (e.g., switch component 104, gate component 212, etc.) can facilitate efficiently controlling speed of the motor 106 based in part on predefined optimization criteria and/or received commands (e.g., a speed command). It is to be appreciated and understood that the optimized control component 102, switch component 104, motor 106, power source 108, gate component 212, controller component 214, and storage component 216 each can be the same or similar, and/or can contain the same or similar functionality, as respective components, as more fully described herein, for example, with regard to system 100, system 200, system 250, and/or system 300.

The system 400 can further include an intelligent component 402 that can be associated with the optimized control component 102 and/or other components (e.g., switch component 104, gate component 212, etc.) to facilitate analyzing data, such as current and/or historical information, and, based in part on such information, can make an inference(s) and/or a determination(s) regarding, for example, the respective timing for turning on an auxiliary switch component 204 associated with an auxiliary winding 208 and/or a main switch component 202 associated with a main winding 210 of a particular motor 106, an optimal motor speed at which a capacitance adjuster switch component 252 (e.g., as depicted in FIG. 2B and described herein) is to be turned on to adjust the amount of capacitance associated with an auxiliary winding 208 of a particular motor 106, etc., to facilitate efficiently controlling speed of the motor 106.

In one aspect, the intelligent component 402 can facilitate tuning the optimized control component 102 so that the optimized control component 102 can facilitate controlling speed of a particular motor 106 based in part on the predefined optimization criteria. For instance, motor characteristics can vary based in part on the type of motor and/or can change over time (e.g., due to wear on the motor). Based in part on current and/or historical evidence, the intelligent component 402 can evaluate such evidence and can infer a respective timing for turning on an auxiliary switch component 204 associated with an auxiliary winding 208 and/or a main switch component 202 associated with a main winding 210 of a particular motor 106 can be adjusted from a specified (or most recent) timing sequence to facilitate optimizing motor efficiency; and/or can infer an optimal motor speed at which an amount of capacitance associated with an auxiliary winding 208 of a particular motor 106 is to be adjusted by turning on (or off) the capacitance adjuster switch component 252 to efficiently (e.g., optimally) operate the motor 106.

It is to be understood that the intelligent component 402 can provide for reasoning about or infer states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data (e.g., historical data), whether or not the events are correlated in close temporal proximity, and whether the events and data come from one or several event and data sources. Various classification (explicitly and/or implicitly trained) schemes and/or systems (e.g., support vector machines, neural networks, expert systems, Bayesian belief networks, fuzzy logic, data fusion engines . . . ) can be employed in connection with performing automatic and/or inferred action in connection with the disclosed subject matter.

A classifier is a function that maps an input attribute vector, x=(x1, x2, x3, x4, xn), to a confidence that the input belongs to a class, that is, f(x)=confidence(class). Such classification can employ a probabilistic and/or statistical-based analysis (e.g., factoring into the analysis utilities and costs) to prognose or infer an action that a user desires to be automatically performed. A support vector machine (SVM) is an example of a classifier that can be employed. The SVM operates by finding a hypersurface in the space of possible inputs, which hypersurface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

The aforementioned systems and/or devices have been described with respect to interaction between several components. It should be appreciated that such systems and components can include those components or sub-components specified therein, some of the specified components or sub-components, and/or additional components. Sub-components could also be implemented as components communicatively coupled to other components rather than included within parent components. Further yet, one or more components and/or sub-components may be combined into a single component providing aggregate functionality. The components may also interact with one or more other components not specifically described herein for the sake of brevity, but known by those of skill in the art.

FIGS. 5-8 illustrate methodologies and/or flow diagrams in accordance with the disclosed subject matter. For simplicity of explanation, the methodologies are depicted and described as a series of acts. It is to be understood and appreciated that the subject innovation is not limited by the acts illustrated and/or by the order of acts, for example acts can occur in various orders and/or concurrently, and with other acts not presented and described herein. Furthermore, not all illustrated acts may be required to implement the methodologies in accordance with the disclosed subject matter. In addition, those skilled in the art will understand and appreciate that the methodologies could alternatively be represented as a series of interrelated states via a state diagram or events. Additionally, it should be further appreciated that the methodologies disclosed hereinafter and throughout this specification are capable of being stored on an article of manufacture to facilitate transporting and transferring such methodologies to computers. The term article of manufacture, as used herein, is intended to encompass a computer program accessible from any computer-readable device, carrier, or media.

Figure 5:
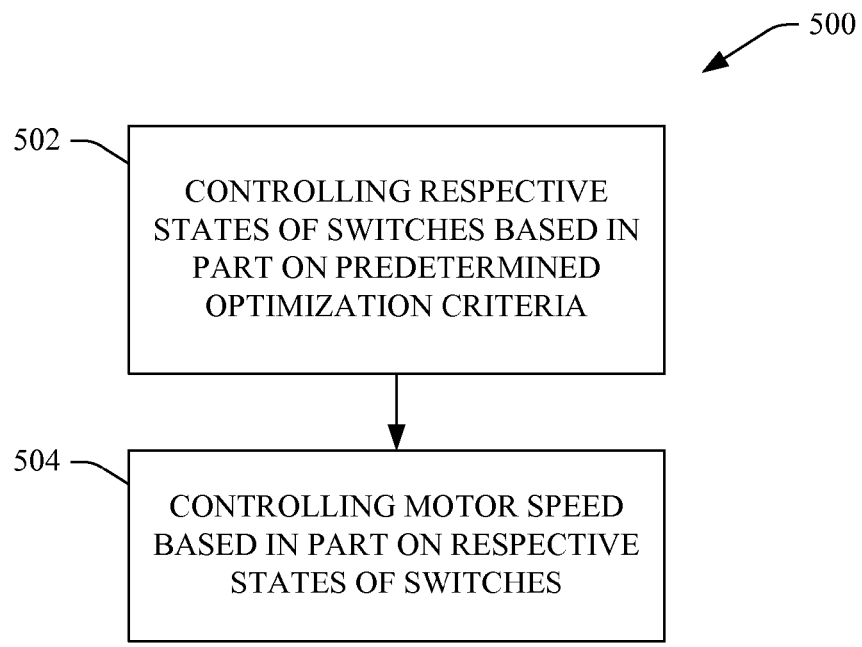
FIG. 5 illustrates a flow diagram of a methodology that can facilitate controlling speed of a motor in accordance with an aspect of the disclosed subject matter.

Referring to FIG. 5, a methodology 500 that can facilitate controlling speed of a motor in accordance with an aspect of the disclosed subject matter is illustrated. At 502, the respective states (e.g., on state, off state) of switches can be controlled based in part on predefined optimization criteria to facilitate controlling speed of a motor 106. In one aspect, a desired number of switches (e.g. triacs) can be electrically connected to the motor 106. In one embodiment, a switch component 104 can employ a main switch component 202 (e.g., triac) and an auxiliary switch component 204, where the auxiliary switch component 204 can be electrically connected to an auxiliary winding 208 of the motor 106, and the main switch component 202 can electrically connect the main winding 210 of the motor 106 to the auxiliary switch component 204.

During each cycle (e.g., AC cycle), the auxiliary switch component 204 can be turned on (e.g., gated on) to turn on the auxiliary winding, where the current can start to rise. At a predetermined amount of time after the auxiliary switch component 204 is turned on, the main switch component 202 can be turned on, which can turn on the main winding, and current in the main winding can start to rise, where the timing of turning on the respective switch components 202 and 204 can be based in part on the predefined optimization criteria. Controlling timing of turning on the respective switch components 202 and 204 can facilitate providing additional phase shift, for instance, at low motor speeds (e.g., motor speed less than full speed, such as three-quarter speed, half speed, etc.), which can result in improved motor efficiency, as, when the motor 106 is at half speed, there can be up to 15% power savings as compared to the power utilized by motors controlled using conventional techniques. The motor speeds where additional phase shift can be realized as well as the amount of power savings can depend in part on the type of motor, the amount of capacitance associated with the auxiliary winding, the motor speed, and/or other factors, for example.

In accordance with another embodiment, the switch component 104 can employ three switches (e.g., triacs) to facilitate controlling speed of the motor 106. An auxiliary switch component 204 can be electrically connected to an auxiliary winding 208 of the motor 106, and a main switch component 202 can electrically connect the main winding 210 of the motor 106 to the auxiliary switch component 204. In one aspect, the auxiliary switch component 204 can be utilized to facilitate controlling speed of the motor 106 based in part on speed commands received by the optimized control component 102. The main switch component 202 can be turned on at a predetermined time after the auxiliary switch component 204 to produce a desired phase shift at lower motor speeds based in part on the predefined optimization criteria to improve motor efficiency (e.g., a lower motor speeds).

In one aspect, the switch component 104 can also include a capacitance adjuster switch component 252 that can facilitate control of the amount of capacitance associated with the auxiliary winding 208 based in part on the predefined optimization criteria to facilitate improving motor efficiency (e.g. reducing power loss in the motor 106). For example, depending in part on the type of motor employed, it can be desirable to increase the amount of capacitance associated with the auxiliary winding when the motor speed is below a predetermined low speed threshold level (e.g., such threshold level can vary based in part on the type of motor) to facilitate increasing the amount of current in the auxiliary winding 208 when the motor speed is below the predetermined low speed threshold level. When the motor speed is below the predetermined low speed threshold level, a gate component 212 in the optimized control component 102 can facilitate turning on (e.g., gating on) the capacitance adjuster switch component 252, which can place capacitor 254 in the circuit with the auxiliary winding 208, in addition to capacitor 206 (e.g., run capacitor), to facilitate increasing the amount of capacitance associated with the auxiliary winding 208. This increased capacitance can improve motor efficiency (e.g., reduce power loss in motor, reduce motor temperature, etc.) at lower motor speeds. When the motor speed is at or above the predetermined low speed threshold level, the gate component 212 can send a signal to the gate of the capacitance adjuster switch component 252 to turn off the capacitance adjuster switch component 252 in order to adjust (e.g., reduce) the amount of capacitance associated with the auxiliary winding 208, so that at the faster motor speeds, there is not an excessive amount of current flowing through the auxiliary winding 208. In accordance with one aspect, in response to a change in the amount of capacitance associated with the auxiliary winding 208, the timing of switching on/off of the auxiliary switch component 204 and main switch component 202 can be modified, as desired, in order to maintain the desired motor speed, as such change in capacitance can potentially result in a change in motor speed.

At 504, the speed of the motor 106 can be controlled based in part on respective states of the switches. In one aspect, the optimized control component 102 can facilitate varying speed of the motor 106 based in part on the optimized control component 102 controlling switching on (e.g., gating on) of the main switch component 202 and auxiliary switch component 204. At this point, methodology 500 can end.

Figure 6:
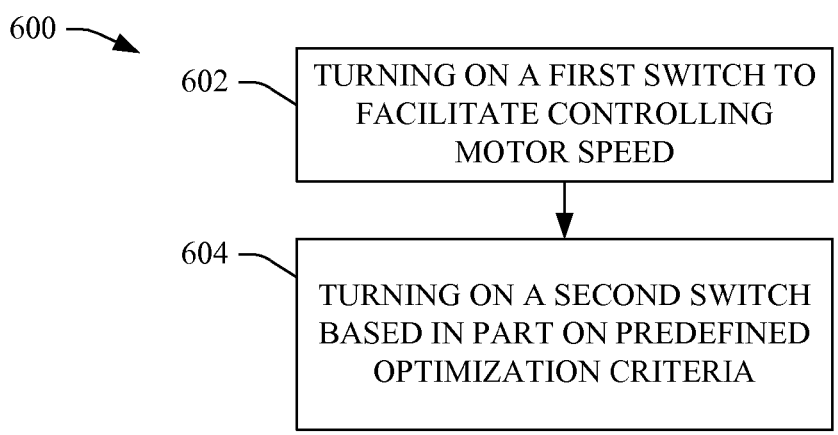
FIG. 6 depicts a flow diagram of a methodology that can facilitate controlling motor speed in accordance with an embodiment of the disclosed subject matter.

Referring to FIG. 6, a methodology 600 that can facilitate controlling speed of a motor in accordance with an embodiment of the disclosed subject matter is illustrated. In accordance with this embodiment, an optimized control component 102 can employ two switches to facilitate efficiently controlling speed of a motor 106. The optimized control component 102 can receive commands (e.g., speed commands) to control the motor 106, and can facilitate controlling the motor 106, including controlling motor speed, based in part on received commands and predefined optimization criteria. At 602, a first switch can be turned on. In one aspect, the optimized control component 102 can include a switch component 104 that can contain an auxiliary switch component 204, which can be the first switch, that can be electrically connected to an auxiliary winding in a motor 106. The auxiliary switch component 204 can include a gate that can be utilized to facilitate turning the auxiliary switch component 204 on and off. The optimized control component 102 can contain a gate component 212 that can be connected to the gate of the auxiliary switch component 204. During each cycle, the gate component 212 can send a signal to the gate of the auxiliary switch component 204 to facilitate turning on (e.g., gating on) the auxiliary switch component 204 based in part on the predefined optimization criteria to facilitate controlling speed of a motor 106.

At 604, a second switch can be turned on based in part on predefined optimization criteria. In one aspect, the switch component 104 can include a main switch component 202, which can be the second switch, that can electrically connect the main winding of the motor 106 to the auxiliary switch component 204. The main switch component 202 can include a gate that can be utilized to facilitate turning the main switch component 202 on and off. The gate component 212 can be connected to the gate of the main switch component 202. During each cycle, the gate component 212 can send a signal to the gate of the main switch component 202 to facilitate turning on (e.g. gating on) the main switch component 202 at a predetermined time after the auxiliary switch component 204 is turned on based in part on the predefined optimization criteria to facilitate improving the efficiency of the motor 106.

Controlling timing of turning on the auxiliary switch component 204 and the main switch component 202, respectively, to maintain a time difference between turning on the respective switch components 202 and 204 can facilitate producing an additional phase shift, particularly at lower motor speeds (e.g., motor speed less than full speed, such as three-quarter speed, half speed, etc.). The additional phase shift can result in improved motor efficiency, as there can be a reduction in power loss, reduction in motor temperature, improved motor life, reduced cost, etc., with regard to the motor 106. For instance, when the motor 106 is operating at approximately half speed, the subject innovation can realize up to approximately 15% reduction in the amount of motor power used, as compared to conventional motor control methodologies or systems.

The particular timing scheme for switching on the auxiliary switch component 204 and the main switch component 202 can depend in part on the type of motor, the speed of the motor, and/or other factors. In one aspect, a look-up table(s) can be employed that can contain information relating to the desired (e.g. optimal) timing of switching on the respective switch components 202, 204 during cycles for a particular type of motor 106. The look-up table(s) can include respective timing information for switching of respective switch components 202, 204 with regard to different types of motors, as desired, as one type of motor can utilize one timing scheme, and another type of motor can have a different timing scheme in order to achieve a desired (e.g. optimal) motor efficiency.

In accordance with an aspect, the look-up table(s) can be stored in a storage component 216 that can be associated with and accessed by a controller component 212 in the optimized control component 102. The controller component 214 can retrieve a desired look-up table, or portion thereof, related to the motor being employed from the storage component 216, and the information in such look-up table, or portion thereof, can be utilized to optimally time the turning on (or off) of each of the switch components 202 and 204, respectively, to facilitate efficiently controlling motor speed while reducing and/or minimizing power loss in the motor 106. At this point, methodology 600 can end.

Figure 7:
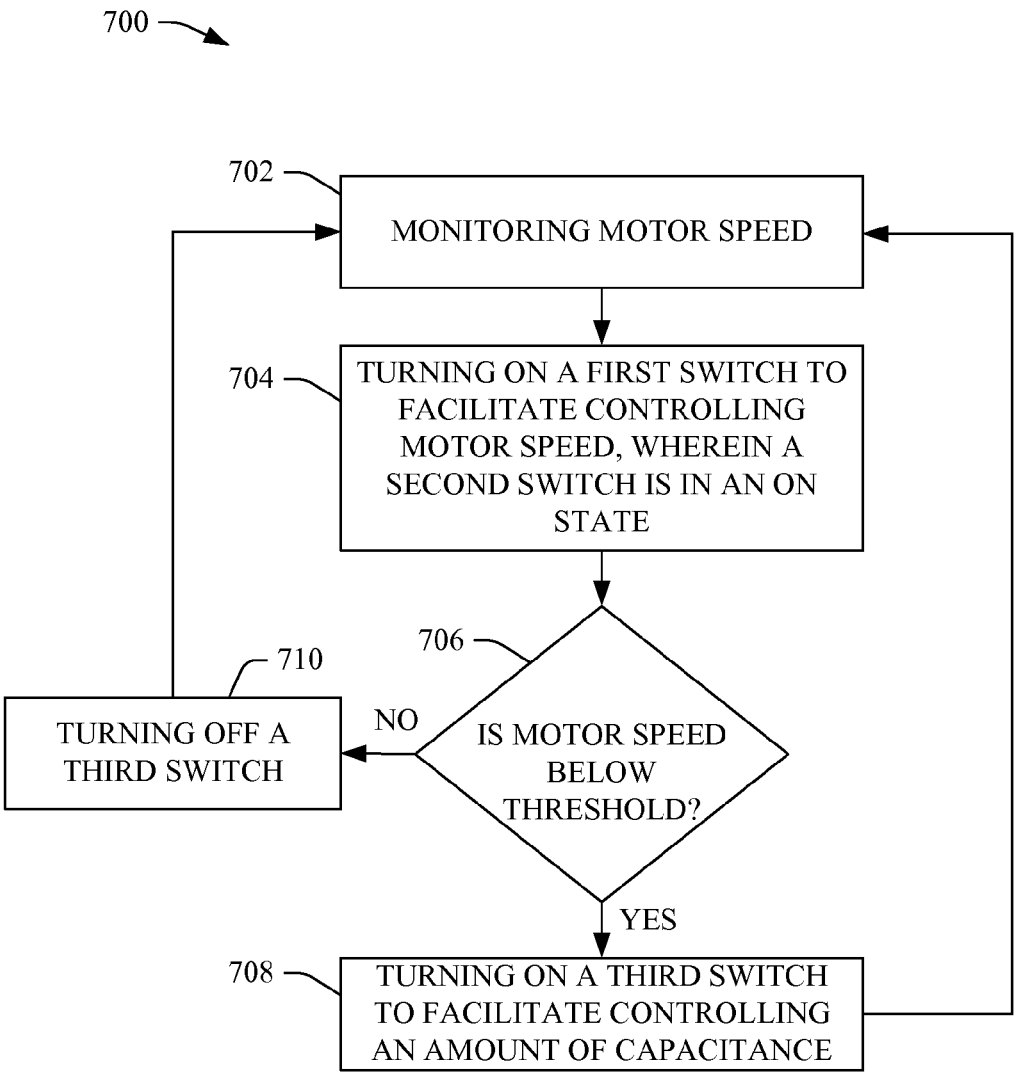
FIG. 7 illustrates a flow diagram of another methodology that can facilitate controlling motor speed in accordance with an embodiment of the disclosed subject matter.

Turning to FIG. 7, depicted is a methodology 700 that can facilitate controlling speed of a motor in accordance with an embodiment of the disclosed subject matter. The optimized control component 102 can receive commands (e.g., speed commands) associated with the motor 106 that can facilitate controlling the motor 106. The optimized control component 102 can facilitate controlling the motor 106, including controlling motor speed, based in part on received commands and/or predefined optimization criteria.

In accordance with this embodiment, an optimized control component 102 can employ three switches (e.g., triacs), where a first switch, which can be an auxiliary switch component 204, can be connected with the auxiliary winding 208 of a motor 106, where there can be a capacitor 206 (e.g., run capacitor) connected in between the auxiliary switch component 204 and the auxiliary winding 208. A second switch, which can be a main switch component 202 can be connected to the main winding 210 of the motor 106 and the auxiliary switch component 204. In accordance with an aspect, the second switch can be in a continuous on state. In yet another aspect, the optimized control component 102 can employ a third switch, which can be a capacitance adjuster switch component 252, that can be electrically connected to a capacitor 254. When the capacitance adjuster switch component 252 is in the on state, the capacitor 254 can be placed in parallel to capacitor 206 and electrically connected to the auxiliary winding 208, which can result in increasing the amount of capacitance associated with the auxiliary winding 208. The third switch can be switched on or off to facilitate connecting or disconnecting, respectively, the capacitor 254 to or from the circuit associated with the auxiliary winding 208, based in part on predefined optimization criteria (e.g., predetermined low speed threshold level) to facilitate adjusting the amount of capacitance associated with the auxiliary winding 208 in order to facilitate improved efficiency in the motor 106, particularly at lower motor speeds (e.g., motor speed less than full speed, such as three-quarter speed, half speed, etc., where the predetermined low speed threshold level associated with adjusting the amount of capacitance can be based in part on the type of motor), where increased capacitance associated with the auxiliary winding 208 can be desirable.

At 702, the speed of a motor 106 can be monitored. In one aspect, the optimized control component 102 can include a monitor component 256 that can monitor the speed of the motor 106 and an evaluation component 258 that can determine the motor speed. Information regarding the motor speed can be utilized to facilitate determining when to turn on respective switches, for example. At 704, a first switch can be turned on (e.g., during each cycle), wherein a second switch can be in an on state (e.g., second switch can be in a continuous on state). In one aspect, the switching on of the first switch can be controlled by the optimized control component 102 to facilitate controlling speed of the motor 106.

At 706, a determination can be made regarding whether the speed of the motor is below a predetermined low speed threshold level. In one aspect, the evaluation component 258 can facilitate determining whether the motor speed is below the predetermined low speed threshold level. If it is determined that the speed of the motor 106 is below the predetermined low speed threshold level, where such threshold level can be based in part on the predefined optimization criteria, at 708, a third switch (e.g., capacitance adjuster switch component 252) can be turned on to facilitate controlling (e.g., increasing) an amount of capacitance associated with the auxiliary winding of the motor. In one aspect, the evaluation component 258 can determine that the motor speed is below the predetermined low speed threshold level, and the controller component 214 can receive information regarding such determination. The controller component 214 can send a signal to the gate component 212 to indicate that the third switch is to be turned on. The gate component 212 can send a signal to the gate of the third switch (e.g., capacitance adjuster switch component 252) to facilitate turning on the third switch. The third switch can be associated (e.g., connected) with the capacitor 254 and the auxiliary winding 208. Turning on the third switch can facilitate increasing the amount of capacitance associated with the auxiliary winding 208 of the motor 106. For instance, turning on the third switch can facilitate electrically connecting an additional capacitor 254 to the auxiliary winding 208, where the capacitor 254 can be in parallel with the capacitor 206, to increase the amount of capacitance associated with the auxiliary winding 208 when the motor 106 is operating at a speed that is below the predetermined low speed threshold. The increase in capacitance can facilitate increasing the current flowing through the auxiliary winding when motor speed is below such threshold level, as current level in the auxiliary winding 208 can be increased based in part on the increased capacitance, which can facilitate improving motor efficiency. At this point, methodology 700 can return to reference numeral 702, where the speed of the motor 106 can continue to be monitored.

Referring again to reference numeral 706, if, at 706, it is determined that the speed of the motor 106 is at or above the predetermined low speed threshold level, at 710, the third switch can be turned off (or if the third switch is already in the off state, the third switch can remain in the off state). Turning off the third switch (or having the third switch remain in the off state) when speed of the motor 106 is at or above the predetermined threshold level can facilitate controlling (e.g., decreasing) the amount of capacitance associated with the auxiliary winding 208. For instance, when the third switch is in the off state, the capacitor 254 is disconnected from the auxiliary winding 208, which can reduce the amount of capacitance associated with the auxiliary winding 208, as only the capacitor 206 is connected to the auxiliary winding 208. Decreasing the capacitance associated with the auxiliary winding 208 when the motor speed is at or above the predetermined low speed threshold level can facilitate preventing excessive current from flowing through the auxiliary winding 208 of the motor 106, which is desirable, as excessive current can harm the motor 106. At this point, methodology 700 can return to reference numeral 702, where the speed of the motor 106 can continue to be monitored. If the evaluation component 258 determines that the motor speed is at or above the predetermined low speed threshold level, such determination can be communicated to the controller component 214. If the third switch is already in the off state, the controller component 214 can take no action, and the third switch can remain in the off state, so that the capacitor 254 is not connected to the auxiliary winding 208. If the third switch is in the on state, where the capacitor 254 is connected to the auxiliary winding 208 to increase the amount of capacitance associated with the auxiliary winding 208, the controller component 214 can transmit a signal to the gate component 212 indicating that the third switch (e.g., capacitance adjuster switch component 252) is to be switched off. The gate component 212 can transmit a signal to the gate of the third switch to facilitate turning off the third switch, and the third switch can be turned off to facilitate disconnecting the capacitor 254 from the auxiliary winding 208.

It should be noted that changing the amount of capacitance associated with the auxiliary winding 208 can result in the motor speed varying from the desired motor speed. In accordance with one aspect, the timing of switching on/off of the auxiliary switch component 204 and/or main switch component 202 can be adjusted, as desired, in order to maintain the desired motor speed when there is a change in the amount of capacitance associated with the auxiliary winding 208.

In accordance with an alternative embodiment, the auxiliary switch component 204 can be placed in a continuous on state, and switching of the main switch component 202 can be controlled to facilitate controlling speed of the motor 106. Methodology 700 can be modified accordingly to perform the switching of the main switch component 202 (e.g., at 704, main switch component 202 can be switched on) during each cycle. In this embodiment, the main gate component 302 can receive information, such as signals from the controller component 214, that can indicate when the main switch component 202 is to be switched on and/or switched off. Based in part on the received information, the main gate component 302 can transmit a desired signal (e.g., on signal, off signal) to the gate of the main switch component 202 to facilitate controlling switching of the main switch component 202 to facilitate controlling speed of the motor 106.

Methodology 700, by controlling the amount of capacitance based in part on the speed of the motor 106, can facilitate significantly improving the efficiency of the motor 106, as power loss can be significantly reduced, motor temperature can be reduced, motor life can be improved, cost related to the motor 106 can be reduced, etc. At this point, methodology 700 can end.

Figure 8:
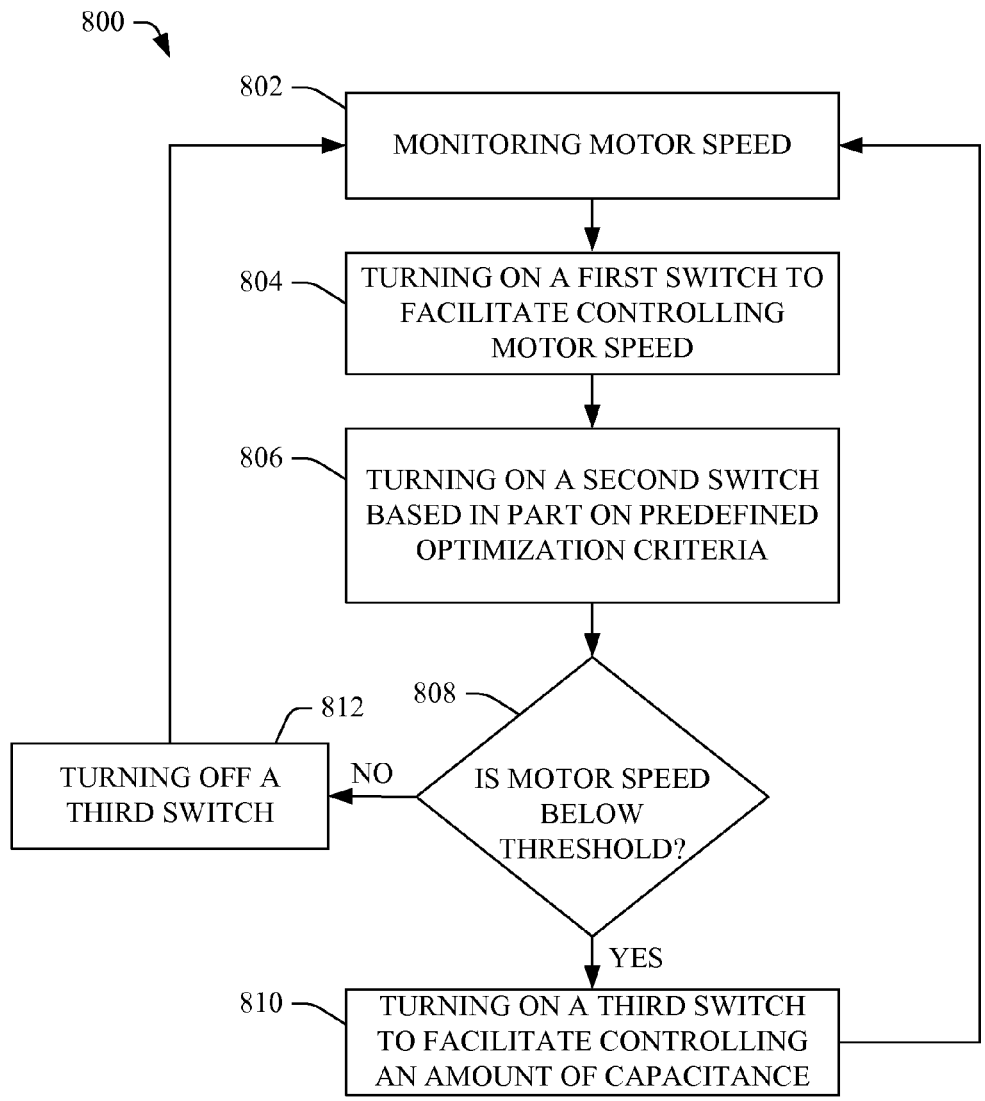
FIG. 8 depicts a flow diagram of a methodology that can facilitate controlling speed of a motor in accordance with an embodiment of the disclosed subject matter.

FIG. 8 depicts a methodology 800 that can facilitate controlling speed of a motor in accordance with an embodiment of the disclosed subject matter. In one aspect, an optimized control component 102 can receive commands (e.g., speed commands) that can be generated and provided to the optimized control component 102 to facilitate controlling parameters or conditions (e.g., speed) associated with the motor 106. The optimized control component 102 can facilitate controlling the motor 106 (e.g., controlling motor speed) based in part on received commands and/or predefined optimization criteria.

In accordance with this embodiment, methodology 800 can facilitate controlling switching on/off of three switches associated with a motor 106 to facilitate efficiently controlling speed of the motor 106 based in part on predefined optimization criteria. In one aspect, an optimized control component 102 can include three switches (e.g., triacs), where a first switch (e.g., an auxiliary switch component 204) can be connected with the auxiliary winding 208 of the motor 106, where there can be a capacitor 206 (e.g. run capacitor) having a desired capacitance value that can be connected in between the auxiliary switch component 204 and the auxiliary winding 208. A second switch (e.g., main switch component 202) can be connected to the main winding 210 of the motor 106 and the auxiliary switch component 204. In yet another aspect, the optimized control component 102 can employ a third switch (e.g., capacitance adjuster switch component 252) that can be connected to a capacitor 254, which can be placed in parallel to capacitor 206 and can be electrically connected to the auxiliary winding 208 when the third switch is switch to the on state, and can be disconnected from the auxiliary winding 208 when the third switch is in the off state. The third switch can be switched on or off to facilitate connecting or disconnecting, respectively, the capacitor 254 to or from the circuit associated with the auxiliary winding 208 in order to facilitate adjusting the amount of capacitance associated with the auxiliary winding 208, which can facilitate improved motor efficiency, particularly at lower motor speeds, wherein, at lower motor speeds (e.g. motor speed below the predetermined low speed threshold level), the third switch can be switched on to facilitate increasing the amount of capacitance associated with the auxiliary winding 208.

At 802, the speed of a motor 106 can be monitored. In one aspect, the optimized control component 102 can include a monitor component that can monitor the speed of the motor 106 and an evaluation component 258 that can determine the motor speed based in part on the information from the monitor component 256. The evaluation component 258 can evaluate information related to motor speed to facilitate determining whether and/or when to turn on respective switches (e.g., auxiliary switch component 204, main switch component 202, capacitance adjuster switch component 252). At 804, a first switch can be turned on. In one aspect, the first switch (e.g., auxiliary switch component 204) can be electrically connected to an auxiliary winding in a motor 106. The first switch can include a gate that can be utilized to facilitate turning the first switch on and off. The optimized control component 102 can contain a gate component 212 that can be connected to the gate of the first switch. The gate component 212 can send a signal to the gate of the first switch to facilitate turning on the first switch based in part on the predefined optimization criteria to facilitate controlling speed of a motor 106.

At 806, a second switch can be turned on based in part on the predefined optimization criteria. In one aspect, the second switch (e.g., main switch component 202), which can electrically connect the main winding 210 of the motor 106 to the first switch, can include a gate that can be utilized to facilitate turning the second switch on and off. The gate component 212 can be connected to the gate of the second switch. The gate component 212 can send a signal to the gate of the second switch to facilitate turning on the second switch at a predetermined time after the first switch is turned on based in part on the predefined optimization criteria to facilitate improving the efficiency of the motor 106.

Controlling timing of turning on the first switch and the second switch, based in part on the predefined optimization criteria, to maintain a time difference between turning on the respective switch components 202 and 204 can facilitate producing a desired phase shift, particularly at lower motor speeds (e.g., motor speed less than full speed, such as three-quarter speed, half speed, etc.). The desired phase shift can result in improved motor efficiency (e.g., reduction in power loss, reduction in motor temperature, improved motor life, reduced cost, etc.) with regard to the motor 106.

The particular timing scheme for switching on the auxiliary switch component 204 and the main switch component 202 can depend in part on the type of motor, the speed of the motor, and/or other factors. In one aspect, a storage component 216 can store a look-up table(s) that can contain information relating to the desired (e.g., optimal) timing of switching on the respective switch components 202, 204 during cycles for a particular type of motor 106. The look-up table(s) can include respective timing information for switching of respective switch components 202, 204 with regard to different types of motors, as desired, as one type of motor can utilize one timing scheme, and another type of motor may have a different timing scheme in order to achieve a desired (e.g., optimal) motor efficiency.

In accordance with an aspect, the storage component 216 can be associated with and accessed by a controller component 212 in the optimized control component 102. The controller component 214 can retrieve a desired look-up table, or portion thereof, related to the motor being employed from the storage component 216, and the information in such look-up table, or portion thereof, can be utilized to optimally time the turning on (or off) of each of the switch components 202 and 204 (and the capacitance adjuster switch component 252, as described herein), respectively, to facilitate efficiently controlling motor speed while reducing and/or minimizing power loss in the motor 106.

At 808, a determination can be made regarding whether the speed of the motor 106 is below a predetermined low speed threshold level. In one aspect, the evaluation component 258 can facilitate determining whether the speed of the motor 106 is below the predetermined low speed threshold level. If it is determined that the speed of the motor 106 is below the predetermined low speed threshold level, where such threshold level can be based in part on the predefined optimization criteria, at 810, a third switch (e.g., capacitance adjuster switch component 252) can be turned on to facilitate increasing the amount of capacitance associated with the auxiliary winding 208, which can improve motor efficiency (e.g. at lower motor speeds). In one aspect, the evaluation component 258 can evaluate (e.g., compare) the motor speed and information related to the predetermined low speed threshold level associated with the motor 106, where such threshold level information can be retrieved from the storage component 216. The evaluation component 258 can determine that the speed of the motor 106 is below the predetermined low speed threshold level, and such determination can be provided to the controller component 214. The controller component 214 can transmit a signal to the gate component 212 to indicate that the third switch is to be turned on. The gate component 212 can transmit a signal to the gate of the third switch to facilitate turning on the third switch.

The third switch can be connected with the capacitor 254 and the auxiliary winding 208. Turning on the third switch can facilitate connecting capacitor 254 to the auxiliary winding 208 to increase the amount of capacitance associated with the auxiliary winding 208. For instance, turning on the third switch can facilitate electrically connecting the capacitor 254 to the auxiliary winding 208, where the capacitor 254 can be in parallel with the capacitor 206, to increase the amount of capacitance associated with the auxiliary winding 208 when the motor 106 is operating at a speed that is below the predetermined low speed threshold. The increase in capacitance can facilitate increasing the current flowing through the auxiliary winding when motor speed is below such threshold level, as current level associated with the auxiliary winding 208 can be increased based in part on the increased capacitance, which can facilitate improving motor efficiency (e.g., reduce power loss, reduce motor temperature, etc., in the motor 106). At this point, methodology 800 can return to reference numeral 802, where the speed of the motor 106 can continue to be monitored.

Referring again to reference numeral 808, if, at 808, it is determined that the speed of the motor 106 is at or above the predetermined low speed threshold level, at 812, the third switch can be turned off (or if the third switch is already in the off state, the third switch can remain in the off state). Switching off the third switch (or having the third switch remain in the off state) when speed of the motor 106 is at or above the predetermined threshold level can facilitate decreasing the amount of capacitance associated with the auxiliary winding 208. For example, when the third switch is in the off state, the capacitor 254 can be disconnected from the auxiliary winding 208, which can reduce the amount of capacitance associated with the auxiliary winding 208, as only the capacitor 206 is connected to the auxiliary winding 208. Decreasing the capacitance associated with the auxiliary winding 208 when the motor speed is at or above the predetermined low speed threshold level can facilitate preventing excessive current from flowing through the auxiliary winding 208 of the motor 106, which can be desirable, as excessive current can harm the motor 106. At this point, methodology 800 can return to reference numeral 802, where the speed of the motor 106 can continue to be monitored. In accordance with an aspect, if the evaluation component 258 evaluates the motor speed and information related to the predetermined low speed threshold level associated with the motor 106 and determines that the speed of the motor 106 is at or above the predetermined low speed threshold level, such determination can be communicated to the controller component 214. If the third switch is already in the off state, the third switch can remain in the off state, so that the capacitor 254 is not connected to the auxiliary winding 208. If the third switch is in the on state, where the capacitor 254 can be connected to the auxiliary winding 208 to increase the amount of capacitance associated with the auxiliary winding 208, the controller component 214 can transmit a signal to the gate component 212 that can indicate that the third switch is to be turned off. The gate component 212 can transmit a signal to the gate of the third switch to facilitate turning off the third switch, and the third switch can be turned off to facilitate disconnecting the capacitor 254 from the auxiliary winding 208, which can thereby reduce the amount of capacitance associated with the auxiliary winding 208.

It is noted that adjusting the amount of capacitance associated with the auxiliary winding 208 can potentially result in the motor speed varying from the desired motor speed. In accordance with one aspect, in response to a change in the amount of capacitance associated with the auxiliary winding 208, the timing of switching on/off of the auxiliary switch component 204 and/or main switch component 202 can be adjusted, as desired, in order to maintain the desired motor speed.

Methodology 800, by controlling the amount of capacitance based in part on the speed of the motor 106, can facilitate significantly improving the efficiency of the motor 106 (e.g., power loss can be significantly reduced, motor temperature can be reduced, motor life can be improved, cost can be reduced, etc.), as compared to conventional methodologies related to controlling motors. At this point, methodology 800 can end.

It is to be understood and appreciated that the computer-implemented programs and software can be implemented within a standard computer architecture. While some aspects of the disclosure have been described above in the general context of computer-executable instructions that can be run on one or more computers, those skilled in the art will recognize that the technology also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices (e.g., PDA), microprocessor-based or programmable consumer electronics, and the like, each of which can be operatively coupled to one or more associated devices.

The illustrated aspects of the disclosure can also be practiced in distributed computing environments where certain tasks are performed by remote processing devices that are linked through a communications network. In a distributed computing environment, program modules can be located in both local and remote memory storage devices.

As utilized herein, terms "component," "system," and the like, can refer to a computer-related entity, either hardware, software (e.g. in execution), and/or firmware. For example, a component can be a process running on a processor, a processor, an object, an executable, a program, and/or a computer. By way of illustration, both an application running on a server and the server can be a component. One or more components can reside within a process and a component can be localized on one computer and/or distributed between two or more computers.

Furthermore, the disclosed subject matter can be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the disclosed subject matter.

What has been described above includes examples of aspects of the disclosed subject matter. It is, of course, not possible to describe every conceivable combination of components or methodologies for purposes of describing the disclosed subject matter, but one of ordinary skill in the art may recognize that many further combinations and permutations of the disclosed subject matter are possible. Accordingly, the disclosed subject matter is intended to embrace all such alterations, modifications and variations that fall within the spirit and scope of the appended claims. Furthermore, to the extent that the terms "includes," "has," or "having," or variations thereof, are used in either the detailed description or the claims, such terms are intended to be inclusive in a manner similar to the term "comprising" as "comprising" is interpreted when employed as a transitional word in a claim.

What is claimed is:

1. A system that facilitates control of motor speed, comprising:
    a motor that is utilized to drive a load; and
    an optimized control component that controls respective switching to a particular state of at least two switch components associated with the motor based in part on predefined optimization criteria, wherein the optimized control component controls at least one of timing of switching the at least two switch components to respective particular states or an amount of capacitance associated with the motor;
    wherein the at least two switch components comprise:
    an auxiliary switch component that is associated with an auxiliary winding of the motor and is switched on at a specified time during a cycle of the motor, and a main switch component that connects a main winding of the motor to the auxiliary switch component, wherein the main switch component is switched on at a predetermined period of time after the auxiliary switch is turned on, based in part on the predefined optimization criteria and to facilitate reducing power loss in the motor.

2. The system of claim 1, wherein the predefined optimization criteria relates to at least one of a type of the motor, a speed of the motor, a time difference between switching on an auxiliary switch component associated with an auxiliary winding and a main switch component associated with a main winding of the motor, an amount of capacitance associated with the auxiliary winding of the motor, or a predetermined low speed threshold level.

3. The system of claim 1, wherein the at least two switch components further comprise:
    at least one capacitance adjuster switch component that is switched on when the speed of the motor is below a predetermined low speed threshold level;
    wherein switching the at least one capacitance adjuster switch on provides the electrical connection of an additional capacitor to the auxiliary winding; and
    wherein the additional capacitor is connected in parallel to a first capacitor associated with the auxiliary winding and increases an amount of capacitance associated with the auxiliary winding.

4. The system of claim 3, wherein at least one of the auxiliary switch component, the main switch component, or the at least one capacitance adjuster switch component is a triac.

5. The system of claim 1, further comprising:
    a gate component that is electrically connected to a respective gate of each of the one or more switch components and the gate component transmits one or more signals to the respective gate of at least one of the at least two switch components to facilitate changing the state of the at least one switch component.

6. The system of claim 1, further comprising:
    a storage component that contains information related to the predefined optimization criteria and provides the predefined optimization criteria to the optimized control component.

7. A system that facilitates control of motor speed, comprising:
    a motor that is utilized to drive a load;
    an optimized control component that controls respective switching to a particular state of at least two switch components associated with the motor, the switching based in part on predefined optimization criteria, wherein the optimized control component controls at least one of timing the switching of the at least two switch components to respective particular states and an amount of capacitance associated with the motor; and
    an evaluation component that evaluates received information related to at least one parameter associated with the motor and information related to the predefined optimization criteria and wherein the evaluation component determines whether an amount of capacitance associated with an auxiliary winding of the motor is to be adjusted.

8. A system that facilitates control of motor speed, comprising:
    a motor that is utilized to drive a load;

an optimized control component that controls respective switching to a particular state of at least two switch components associated with the motor based in part on predefined optimization criteria, wherein the optimized control component controls at least one of timing of the switching of the at least two switch components to respective particular states and an amount of capacitance associated with the motor; and an intelligent component that evaluates current and historical evidence associated with the motor and determines at least one of an adjustment of an amount of capacitance associated with an auxiliary winding of the motor, or a timing scheme for switching an auxiliary switch component associated with an auxiliary winding and a main switch component associated with a main winding of the motor.

9. The system of claim 8, wherein the motor is a permanent split capacitor motor.

10. A method that facilitates controlling the speed of a motor, comprising:

controlling a respective state of at least two switches associated with the motor as a function of predefined optimization criteria;

controlling at least one of a speed of the motor and an amount of capacitance associated with the motor, the controlling based in part on the respective states of the at least two switches and as a function of the predefined optimization criteria;

switching on an auxiliary switch component associated with an auxiliary winding of the motor at a specified time during a cycle of the motor; and switching on a main switch component, which connects a main winding of the motor to the auxiliary switch component, at a predetermined amount of time after the auxiliary switch component is switched on to facilitate producing additional phase shift in the motor to improve motor efficiency, based in part on the predefined optimization criteria.

11. The method of claim 10, further comprising:
at least one of:
switching on a capacitance adjuster switch component to facilitate increasing an amount of capacitance associated with the auxiliary winding when speed of the motor is changed from a speed that is at or above a predetermined low speed threshold level to a speed that is below the predetermined low speed threshold level, or switching off a capacitor adjuster switch component to facilitate decreasing the amount of capacitance associated with the auxiliary winding when speed of the motor is changed from a speed that is below the predetermined low speed threshold level to a speed that is at or above the predetermined low speed threshold level, in order to facilitate improving efficiency of the motor.

12. A method that facilitates controlling the speed of a motor, comprising:

controlling a respective state of at least two switches associated with the motor as a function of predefined optimization criteria;

controlling at least one of the speed of the motor and an amount of capacitance associated with the motor, the controlling based in part on the respective states of the at least two switches as a function of the predefined optimization criteria; and controlling speed of the motor based in part on switching an auxiliary switch component between an off state and an on state, wherein the auxiliary switch component is connected to an auxiliary winding of the motor and a main switch component, which connects a main winding of the motor to the auxiliary switch component, is maintained in an on state.

13. The method of claim 12, further comprising:
controlling an amount of capacitance associated with an auxiliary winding of the motor so the amount of capacitance is higher when the speed of the motor is below a predetermined low speed threshold level and the amount of capacitance is lower when the speed of the motor is at or above the predetermined low speed threshold level.

14. A method that facilitates controlling the speed of a motor, comprising:

controlling a respective state of at least two switches associated with the motor as a function of predefined optimization criteria;

controlling at least one of the speed of the motor and an amount of capacitance associated with the motor, the controlling based in part on the respective states of the at least two switches as a function of the predefined optimization criteria;

monitoring speed of the motor;

detecting a change in the speed of the motor, the change in speed is at least one of changing from a high speed to a low speed or changing from a low speed to a high speed, wherein the high speed is at or above a predetermined low speed threshold level associated with the motor and the low speed is below the predetermined low speed threshold level;

retrieving information relating to the predetermined low speed threshold level;

comparing the speed of the motor with the predetermined low speed threshold level; and at least one of:
increasing an amount of capacitance associated with an auxiliary winding of the motor if the change in speed of the motor is from high speed to low speed, or decreasing an amount of capacitance associated with an auxiliary winding of the motor if the change in speed of the motor is from low speed to high speed.

15. The method of claim 14, wherein the predefined optimization criteria relates to at least one of a type of the motor, a speed of the motor, a time difference between switching on an auxiliary switch component associated with an auxiliary winding and a main switch component associated with a main winding of the motor, an amount of capacitance associated with the auxiliary winding of the motor, or a predetermined low speed threshold level.

16. A system that facilitates controlling speed of a motor, comprising:

means for controlling a respective state of at least two switch components associated with the motor based in part on predefined optimization criteria;

means for controlling at least one of the speed of the motor or an amount of capacitance associated with the motor, the controlling based in part on respective states of the at least two switch components;

means for controlling switching of a capacitance adjuster switch component to facilitate at least one of: (a) increasing an amount of capacitance associated with an auxiliary winding of the motor when speed of the motor is changed from a high speed to a low speed and (b) decreasing an amount of capacitance associated with the auxiliary winding when speed of the motor is changed from a low to a high speed;

wherein the low speed is below a predetermined low speed threshold level associated with the motor and the high speed is at or above the predetermined low speed threshold level; and means for controlling timing of respectively switching on an auxiliary switch component associated with the auxiliary winding and a main switch component that connects a main winding to the auxiliary switch component during a cycle, wherein the main switch component is switched on a predetermined period of time after the auxiliary switch component is switched on to facilitate producing an additional phase shift to facilitate improved motor efficiency, based in part on the predefined optimization criteria.

* * * * *